US012732447B2

(12) United States Patent
Chou et al.

(10) Patent No.: US 12,732,447 B2
(45) Date of Patent: Sep. 8, 2026

(54) PERFORMANCE MEASUREMENTS FOR NETWORK EXPOSURE FUNCTION

(71) Applicant: INTEL CORPORATION, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 267 days.

(21) Appl. No.: 18/574,942

(22) PCT Filed: Aug. 2, 2022

(86) PCT No.: PCT/US2022/039213
§ 371 (c)(1),
(2) Date: Dec. 28, 2023

(87) PCT Pub. No.: WO2023/014745
PCT Pub. Date: Feb. 9, 2023

(65) Prior Publication Data

US 2024/0333623 A1 Oct. 3, 2024

Related U.S. Application Data

(60) Provisional application No. 63/230,572, filed on Aug. 6, 2021.

(51) Int. Cl.
*H04L 43/091* (2022.01)
*H04L 12/14* (2024.01)
*H04L 41/5009* (2022.01)

(52) U.S. Cl.
CPC ........ *H04L 43/091* (2022.05); *H04L 12/1407* (2013.01); *H04L 41/5009* (2013.01)

(58) Field of Classification Search
CPC ............... H04L 43/091; H04L 12/1407; H04L 41/5009; H04L 67/51; H04L 67/53; H04W 88/14
See application file for complete search history.

(56) References Cited

U.S. PATENT DOCUMENTS

2019/0253912 A1* 8/2019 Yao ....................... H04W 24/10
2019/0354607 A1* 11/2019 Snow ................... H04L 67/535
(Continued)

FOREIGN PATENT DOCUMENTS

WO 2020181496 A1 9/2020

OTHER PUBLICATIONS

3GPP TS 28.552 V17.3.1 "3rd Generation Partnership Project; Technical Specification Group Services and System Aspects; Management and orchestration; 5G performance measurements (Release 17)" (Year: 2021).*
(Continued)

*Primary Examiner* — Sun Jong Kim
(74) *Attorney, Agent, or Firm* — Gray Ice Higdon, PLLC

(57) ABSTRACT

This disclosure describes systems, methods, and devices related to performance measurements. A device may decode a service request received from a management service consumer for the 5G system (5GS), wherein the service request may be associated with a performance measurement collection service to be delivered by the service producer to the service consumer related to a network exposure function (NEF). The device may detect performance measurements data received from the NEF. The device may decode from the performance measurements data a measurement label associated with the performance measurements data based on the service request. The device may encode a service response based on the performance measurements data received from the NEF.

18 Claims, 7 Drawing Sheets

(56) References Cited

U.S. PATENT DOCUMENTS

| | | | | |
|---|---|---|---|---|
| 2020/0404073 | A1 | 12/2020 | Huang et al. | |
| 2021/0014141 | A1* | 1/2021 | Patil | H04W 76/25 |
| 2021/0120473 | A1 | 4/2021 | Yao et al. | |
| 2021/0168643 | A1 | 6/2021 | Yao et al. | |
| 2024/0064557 | A1* | 2/2024 | Wei | H04W 72/12 |
| 2024/0129739 | A1* | 4/2024 | Kunz | H04W 12/037 |

OTHER PUBLICATIONS

U.S. Appl. No. 63/151,473, filed Feb. 19, 2021 (Year: 2021).*
International Search Report and Written Opinion mailed Nov. 17, 2022 in Application No. PCT/US2022/039213, 11 pages.
3GPP TSG SA "Management and orchestration; 5G performance measurements," 3GPP TS 28.552 V17.3.1, Jun. 24, 2021, 26 pages.

* cited by examiner

5G NF performance measurements generaton method

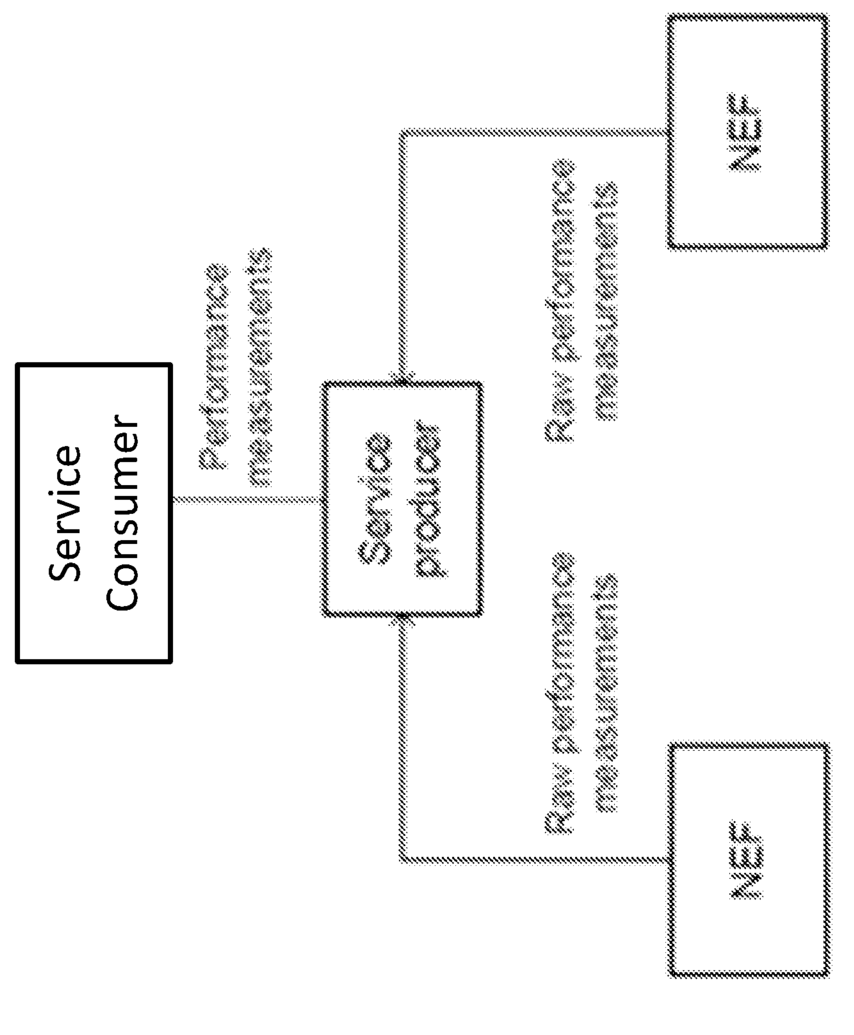
FIG. 3B
FIGs. 3A-3B
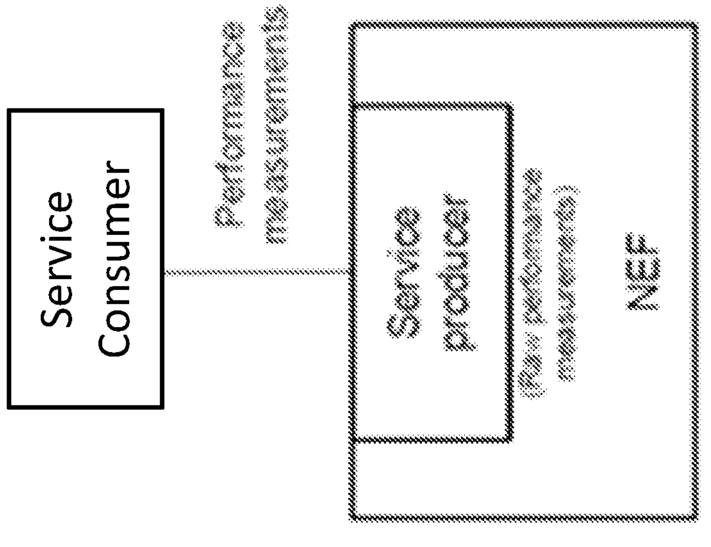
FIG. 3A

PERFORMANCE MEASUREMENTS FOR NETWORK EXPOSURE FUNCTION

CROSS-REFERENCE TO RELATED APPLICATION(S)

This application is a U.S. National Stage Application under 35 U.S.C. 371 and claims the priority benefit of International Application No. PCT/US2022/039213, filed Aug. 2, 2022, and claims the benefit of U.S. Provisional Application No. 63/230,572, filed Aug. 6, 2021, the disclosures of which are incorporated herein by reference as if set forth in full.

TECHNICAL FIELD

This disclosure generally relates to systems and methods for wireless communications and, more particularly, to performance measurements for network exposure function (NEF).

BACKGROUND

In a 5G system (5GS), a network exposure function (NEF), located between the 5G core network and external third-party applications is responsible for managing external open network data.

BRIEF DESCRIPTION OF THE DRAWINGS

FIGS. 3A-3B depict illustrative schematic diagrams for performance measurements, in accordance with one or more example embodiments of the present disclosure.

DETAILED DESCRIPTION

Figure 1:
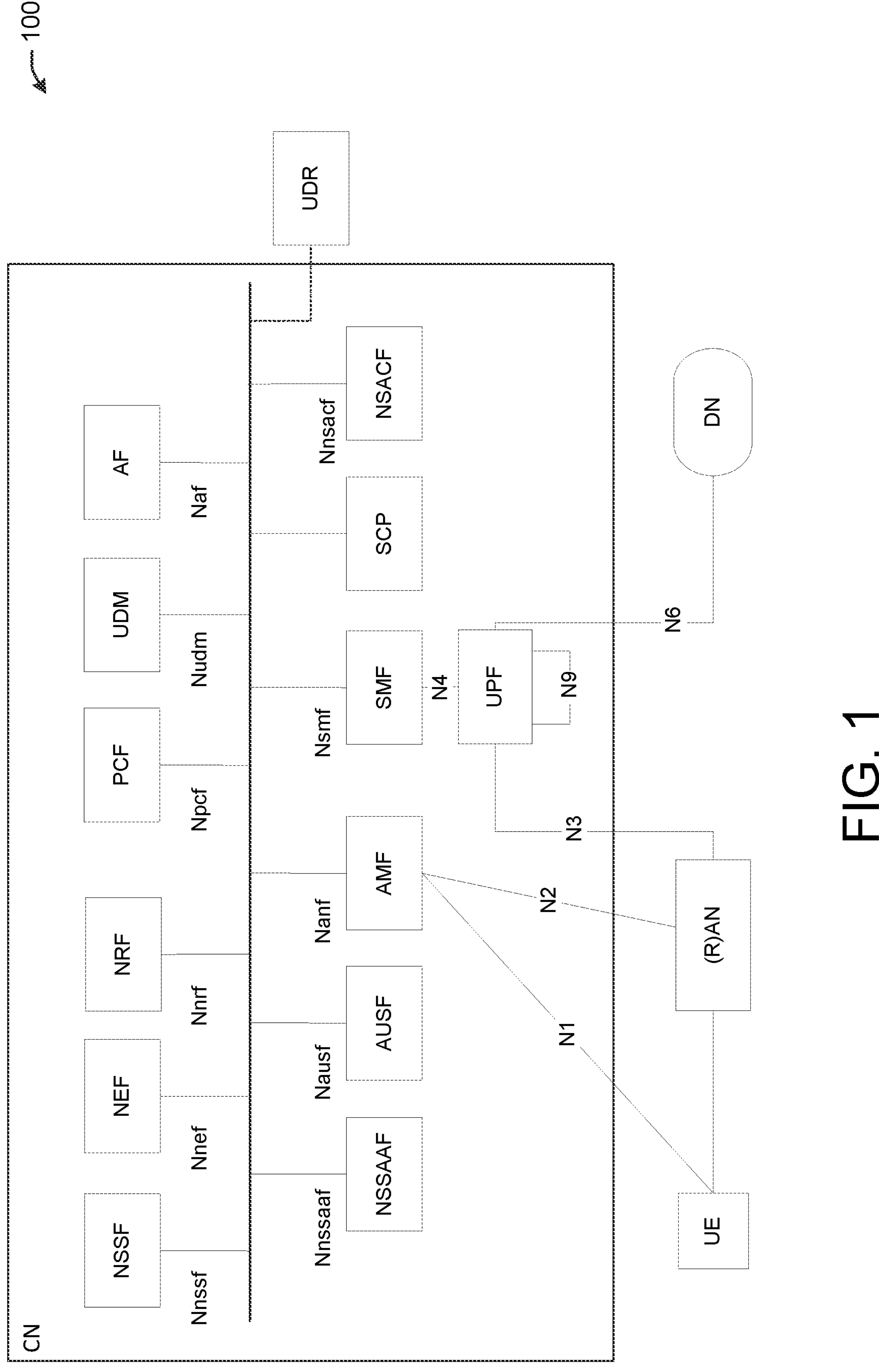
FIG. 1 is a network diagram illustrating an example network environment for performance measurements, in accordance with one or more example embodiments of the present disclosure.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Unified Data Repository (UDR) provides data management services for the subscriber and application related data, including Subscription Data, Policy Data, Structured Data for exposure, Application data, such as, Packet Flow Descriptions (PFDs) for application detection and AF request information for multiple UEs, and/or NF Group ID corresponding to subscriber identifier (e.g. IMPI, IMPU, SUPI). The data management services provided by UDR allow its consumer (e.g., UDM, PCF, and NEF) to read, create, update, delete a particular set of data and subscribe/unsubscribe to notification of relevant data changes.

Users' service may not be fulfilled due to a poorly performing (e.g. overloaded) data management service, therefore it is indispensable that the performance of data management services can be monitored. Therefore, the performance measurements related to data creation, update, deletion, and modification notification subscriptions for NEF are needed for monitoring the performance of the events and services of NEF. To support a specific quality of service (QoS) requirements for an application, the application function (AF) may provide the required QoS information when setting up the connection with the UE. The NEF offers the "AF session with QoS" service allowing the AF to send the QoS information for the session, and then interacts with 5G core network (5GC) network functions (NFs) to apply the QoS requirements to the session.

If the 5GC fails to meet required QoS for an application for the UE, the user's experience is directly impacted. Therefore, the performance of "AF session with QoS" needs to be monitored. The AF may need to negotiate the policies for future background data transfer with 5GS via NEF, and apply the negotiated policies for a future protocol data unit (PDU) Session at some point.

The measurements for background data transfer policy negotiation have been defined, however the measurements on background data transfer policy application are missing.

The UE radio capability management function (UCMF) is used for storage of dictionary entries corresponding to either PLMN-assigned or Manufacturer-assigned UE Radio Capability IDs. The UE radio capability provisioning service is provided by the UCMF. This service allows NF service consumers to create, update and delete UCMF dictionary entries for Manufacturer-assigned UE Radio Capability IDs.

Provisioning of Manufacturer-assigned UE Radio Capability ID entries in the UCMF is performed from an AF that interacts with the UCMF either directly or via the NEF.

Knowing the UE radio capabilities is critical for the 5G system to provide the appropriate control for the UE, missing the UE radio capabilities may cause discretional control for the UEs thus result in failures or performance degradation. Therefore, the performance measurements are needed to assess the performance of UCMF provisioning.

Among other things, embodiments of the present disclosure are directed to generating measurements related to an AF session with QoS, policy application, and UCMF provisioning for NEF. Embodiments of the present disclosure help improve existing systems as providing measurements related to AF session with QoS, policy application and UCMF provisioning are data reflecting the performance of the 5GS in terms of supporting external applications.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an illustrative schematic diagram for performance measurements, in accordance with one or more example embodiments of the present disclosure.

FIG. 1 illustrates an architecture of a system 100 of a network Users' service may not be fulfilled due to a poorly performing (e.g. overloaded) data management service, therefore it is indispensable that the performance of data management services can be monitored. Therefore, the performance measurements related to data creation, update, deletion, and modification notification subscriptions for NEF are needed for monitoring the performance of the services and events of the NEF.

Users' service may not be fulfilled due to a poorly performing (e.g. overloaded) data management service, therefore it is indispensable that the performance of data management services can be monitored. Therefore, the performance measurements related to data creation, update, deletion, and modification notification subscriptions for UDR are needed for monitoring the performance of the data management service for UDR.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an illustrative schematic diagram for performance measurements, in accordance with one or more example embodiments of the present disclosure.

FIG. 1 illustrates an architecture of a system 100 of a network in accordance with some embodiments. Service-based interfaces are used within the Control Plane of a 5G System architecture, in accordance with one or more example embodiments of the present disclosure. unified data repository (UDR).

UDR in the 5G environment is considered as a database for the 5G-specific information about the subscriptions. These four different collections of parameters are made available to various 5G Network Functions. The Subscription Data is made available via the Unified Data Management (UDM) front-end to a number of NFs that control the UE's activities within the network: AMF, SMF, AUSF, etc. The Policy Data is made available (directly, via the N36 interface) to the PCF—meaning that the UDR effectively replaces the earlier functionality of the Subscriber Profile Repository (SPR). Application Data is placed into the UDR by the external AFs, via the Network Exposure Function (NEF), in order to be made available to whichever 5G NFs need—and are authorized to request—subscriber-related information.

Defining distinct groups of parameters also enables distributed UDR deployments, with the different functionalities defined along the lines of the parameter collections. There can be multiple UDRs deployed in the network, each of which can accommodate different data sets or subsets, (e.g. subscription data, subscription policy data, data for exposure, application data) and/or serve different sets of NFs. Deployments where a UDR serves a single NF and stores its data, and, thus, can be integrated with this NF, can be possible.

The system 100 is shown to include a UE, a RAN node, a data network (DN), which may be, for example, operator services, Internet access or 3rd party services; and a 5G Core Network (5GC or CN).

The CN may include an NSSAAF, a Service Communication Pro4 (SCP), a Network Slice Admission Control Function (NSACF), an Authentication Server Function (AUSF), an Access and Mobility Management Function (AMF), a Session Management Function (SMF), a Network Exposure Function (NEF), a Policy Control Function (PCF), a Network Function (NF) Repository Function (NRF), a Unified Data Management (UDM), an Application Function (AF), a User Plane Function (UPF); and a Network Slice Selection Function (NSSF).

The Network Slice-specific and Stand-alone Non-Public Network (SNPN) Authentication and Authorization Function (NSSAAF) supports the Network Slice-Specific Authentication and Authorization functionality. When the NSSAAF is deployed in a PLMN, the NSSAAF supports Network Slice-Specific Authentication and Authorization, while when the NSSAAF is deployed in a SNPN the NSSAAF can support Network Slice-Specific Authentication and Authorization and/or the NSSAAF can support access to SNPN using credentials from Credentials Holder.

The UPF may act as an anchor point for intra-RAT and inter-RAT mobility, an external PDU session point of interconnect to DN, and a branching point to support multi-homed PDU sessions. The UPF may also perform packet routing and forwarding, perform packet inspection, enforce user plane part of policy rules, lawfully intercept packets (UP collection); perform traffic usage reporting, perform QoS handling for user plane (e.g., packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF may include an uplink classifier to support routing traffic flows to a data network. The DN may represent various network operator services, Internet access, or third party services. DN may include, or be similar to, application server discussed previously. The UPF may interact with the SMF via an N4 reference point between the SMF and the UPF.

The AUSF may store data for authentication of UE and handle authentication related functionality. The AUSF may facilitate a common authentication framework for various access types. The AUSF may communicate with the AMF via an N12 reference point between the AMF and the AUSF, and may communicate with the UDM via an N13 reference point between the UDM and the AUSF. Additionally, the AUSF may exhibit an Nausf service-based interface.

The AMF may be responsible for registration management (e.g., for registering UE, etc.), connection management, reachability management, mobility management, lawful interception of AMF-related events, and access authentication and authorization. The AMF may be a termination point for an N11 reference point between the AMF and the SMF. The AMF may provide transport for Session Management (SM) messages between the UE and the SMF, and act as a transparent pro4 for routing SM messages. AMF may also provide transport for short message service (SMS) messages between UE and an SMS function (SMSF) (not shown by FIG. 1). AMF may act as Security Anchor Function (SEA), which may include interaction with the AUSF and the UE, receipt of an intermediate key that was established as a result of the UE authentication process. Where USIM based authentication is used, the AMF may retrieve the security material from the AUSF. AMF may also include a Security Context Management (SCM) function, which receives a key from the SEA that it uses to derive access-network specific keys. Furthermore, AMF may be a termination point of RAN CP interface, which may include or be an N2 reference point between the (R)AN and the AMF; and the AMF may be a termination point of NAS (N1) signaling, and perform NAS ciphering and integrity protection.

AMF may also support NAS signaling with a UE over an N3 interworking-function (IWF) interface. The N3IWF may be used to provide access to untrusted entities. N3IWF may be a termination point for the N2 interface between the (R)AN and the AMF for the control plane, and may be a termination point for the N3 reference point between the (R)AN and the UPF for the user plane. As such, the AMF may handle N2 signaling from the SMF and the AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS signaling between the UE and AMF via an N1 reference point between the UE and the AMF, and relay uplink and downlink user-plane packets between the UE and UPF. The N3IWF also provides mechanisms for IPsec tunnel establishment with the UE. The AMF may exhibit an Namf service-based interface and may be a termination point for an N14 reference point between two AMFs and an N17 reference point between the AMF and a 5G-Equipment Identity Register (5G-EIR) (not shown by FIG. 1).

The SMF may be responsible for session management (e.g., session establishment, modify and release, including tunnel maintenance between UPF and AN node); UE IP address allocation and management (including optional authorization); selection and control of UP function; configuring traffic steering at UPF to route traffic to proper destination; termination of interfaces towards policy control functions; controlling part of policy enforcement and QoS; lawful intercept (for SM events and interface to LI system); termination of SM parts of NAS messages; downlink Data Notification; initiation of AN specific SM information, sent via AMF over N2 to (R)AN; and determining SSC mode of a session. The SMF may include the following roaming functionality: handle local enforcement to apply QoS SLAB (VPLMN); charging data collection and charging interface (VPLMN); lawful intercept (in VPLMN for SM events and interface to LI system); support for interaction with external DN for transport of signaling for PDU session authorization/authentication by external DN. An N16 reference point between two SMFs may be included in the system, which may be between another SMF in a visited network and the SMF in the home network in roaming scenarios. Additionally, the SMF may exhibit the Nsmf service-based interface.

The NEF may provide means for securely exposing the services and capabilities provided by 3GPP network functions for third party, internal exposure/re-exposure, Application Functions (e.g., AF), edge computing or fog computing systems, etc. In such embodiments, the NEF may authenticate, authorize, and/or throttle the AFs. NEF may also translate information exchanged with the AF and information exchanged with internal network functions. For example, the NEF may translate between an AF-Service-Identifier and an internal 5GC information. NEF may also receive information from other network functions (NFs) based on exposed capabilities of other network functions. This information may be stored at the NEF as structured data, or a data storage NF using standardized interfaces. The stored information can then be re-exposed by the NEF to other NFs and AFs, and/or used for other purposes such as analytics. Additionally, the NEF may exhibit an Nnef service-based interface.

The NRF may support service discovery functions, receive NF Discovery Requests from NF instances, and provide the information of the discovered NF instances to the NF instances. NRF also maintains information on available NF instances and their supported services. As used herein, the terms "instantiate", "instantiation", and the like may refer to the creation of an instance, and an "instance" may refer to a concrete occurrence of an object, which may occur, for example, during the execution of program code. Additionally, the NRF may exhibit the Nnrf service-based interface.

The PCF may provide policy rules to control plane function(s) to enforce them, and may also support unified policy framework to govern network behavior. The PCF may also implement a front end (FE) to access subscription information relevant for policy decisions in a UDR of the UDM. The PCF may communicate with the AMF via an N15 reference point between the PCF and the AMF, which may include a PCF in a visited network and the AMF in case of roaming scenarios. The PCF may communicate with the AF via an N5 reference point between the PCF and the AF; and with the SMF via an N7 reference point between the PCF and the SMF. The system 100 and/or CN may also include an N24 reference point between the PCF (in the home network) and a PCF in a visited network. Additionally, the PCF may exhibit an Npcf service-based interface.

The UDM may handle subscription-related information to support the network entities' handling of communication sessions, and may store subscription data of UE. For example, subscription data may be communicated between the UDM and the AMF via an N8 reference point between the UDM and the AMF. The UDM may include two parts, an application FE and a User Data Repository (UDR). The UDR may store subscription data and policy data for the UDM and the PCF, and/or structured data for exposure and application data (including Packet Flow Descriptions (PFDs) for application detection, application request information for multiple UEs) for the NEF. The Nudr service-based interface may be exhibited by the UDR to allow the UDM, PCF, and NEF to access a particular set of the stored data, as well as to read, update (e.g., add, modify), delete, and subscribe to the notification of relevant data changes in the UDR. The UDM may include a UDM FE, which is in charge of processing of credentials, location management, subscription management, and so on. Several different front ends may serve the same user in different transactions. The UDM-FE accesses subscription information stored in the UDR and performs authentication credential processing; user identifier handling; access authorization; registration/mobility management; and subscription management. The UDR may interact with the SMF via an N10 reference point between the UDM and the SMF. UDM may also support SMS management, wherein an SMS-FE implements a similar application logic as discussed previously. Additionally, the UDM may exhibit the Nudm service-based interface.

The AF may provide application influence on traffic routing, provide access to the Network Capability Exposure (NCE), and interact with the policy framework for policy control. The NCE may be a mechanism that allows the 5GC and AF to provide information to each other via NEF, which may be used for edge computing implementations. In such implementations, the network operator and third party services may be hosted close to the UE access point of attachment to achieve an efficient service delivery through the reduced end-to-end latency and load on the transport network. For edge computing implementations, the 5GC may select a UPF close to the UE and execute traffic steering from the UPF to DN via the N6 interface. This may be based on the UE subscription data, UE location, and information provided by the AF. In this way, the AF may influence UPF (re)selection and traffic routing. Based on operator deployment, when AF is considered to be a trusted entity, the network operator may permit AF to interact directly with relevant NFs. Additionally, the AF may exhibit an Naf service-based interface.

The NSSF may select a set of network slice instances serving the UE. The NSSF may also determine allowed Network Slice Selection Assistance Information (NSSAI) and the mapping to the Subscribed Single-NSSAIs (S-NSSAIs), if needed. The NSSF may also determine the AMF set to be used to serve the UE, or a list of candidate AMF(s) based on a suitable configuration and possibly by querying the NRF. The selection of a set of network slice instances for the UE may be triggered by the AMF with which the UE is registered by interacting with the NSSF, which may lead to a change of AMF. The NSSF may interact with the AMF via an N22 reference point between AMF and NSSF; and may communicate with another NSSF in a visited network via an N31 reference point (not shown by FIG. 7). Additionally, the NSSF may exhibit an Nnssf service-based interface.

As discussed previously, the CN may include an SMSF, which may be responsible for SMS subscription checking and verification, and relaying SM messages to/from the UE to/from other entities, such as an SMS-GMSC/IWMSC/SMS-router. The SMS may also interact with AMF and UDM for notification procedure that the UE is available for SMS transfer (e.g., set a UE not reachable flag, and notifying UDM when UE is available for SMS).

The CN may also include other elements that are not shown by FIG. 1, such as a Data Storage system/architecture, a 5G-Equipment Identity Register (5G-EIR), a Security Edge Protection Pro4 (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 1). Individual NFs may share a UDSF for storing their respective unstructured data or individual NFs may each have their own UDSF located at or near the individual NFs. Additionally, the UDSF may exhibit a Nudsf service-based interface. The 5G-EIR may be an NF that checks the status of Permanent Equipment Identifiers (PEI) for determining whether particular equipment/entities are blacklisted from the network; and the SEPP may be a non-transparent pro4 that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 1 for clarity. In one example, the CN may include an Nx interface, which is an inter-CN interface between the MME and the AMF in order to enable interworking between CN and other CNs. Other example interfaces/reference points may include an N5g-eir service-based interface exhibited by a 5G-EIR, an N27 reference point between NRF in the visited network and the NRF in the home network, and an N31 reference point between the NSSF in the visited network and the NSSF in the home network.

In yet another example, system 100 may include multiple RAN nodes wherein an Xn interface is defined between two or more RAN nodes (e.g., gNBs and the like) that connect to 5GC, between a RAN node (e.g., gNB) connecting to 5GC and an eNB (e.g., a RAN node) and/or between two eNBs connecting to 5GC. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE in a connected mode (e.g., CM-CONNECTED) including functionality to manage the UE mobility for connected mode between one or more RAN nodes. The mobility support may include context transfer from an old (source) serving RAN node to a new (target) serving RAN node, and control of user plane tunnels between old (source) serving RAN node to a new (target) serving RAN node. A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be the same as or similar to the user plane and/or control plane protocol stack(s) shown and described herein.

In one or more embodiments, all depicted Network Functions can interact with the UDSF, UDR, NEF and NRF as necessary. The UDM uses subscription data and authentication data and the PCF uses policy data that may be stored in UDR.

In one or more embodiments, a performance measurements system may generate measurements related to data creation, update, deletion, and modification notification subscriptions for UDR. The measurements related to data creation, update, deletion, and modification notification subscription for UDR are fundamental data reflecting the performance of the data management service in 5GS.

It is understood that the above descriptions are for purposes of illustration and are not meant to be limiting.

Figure 2:
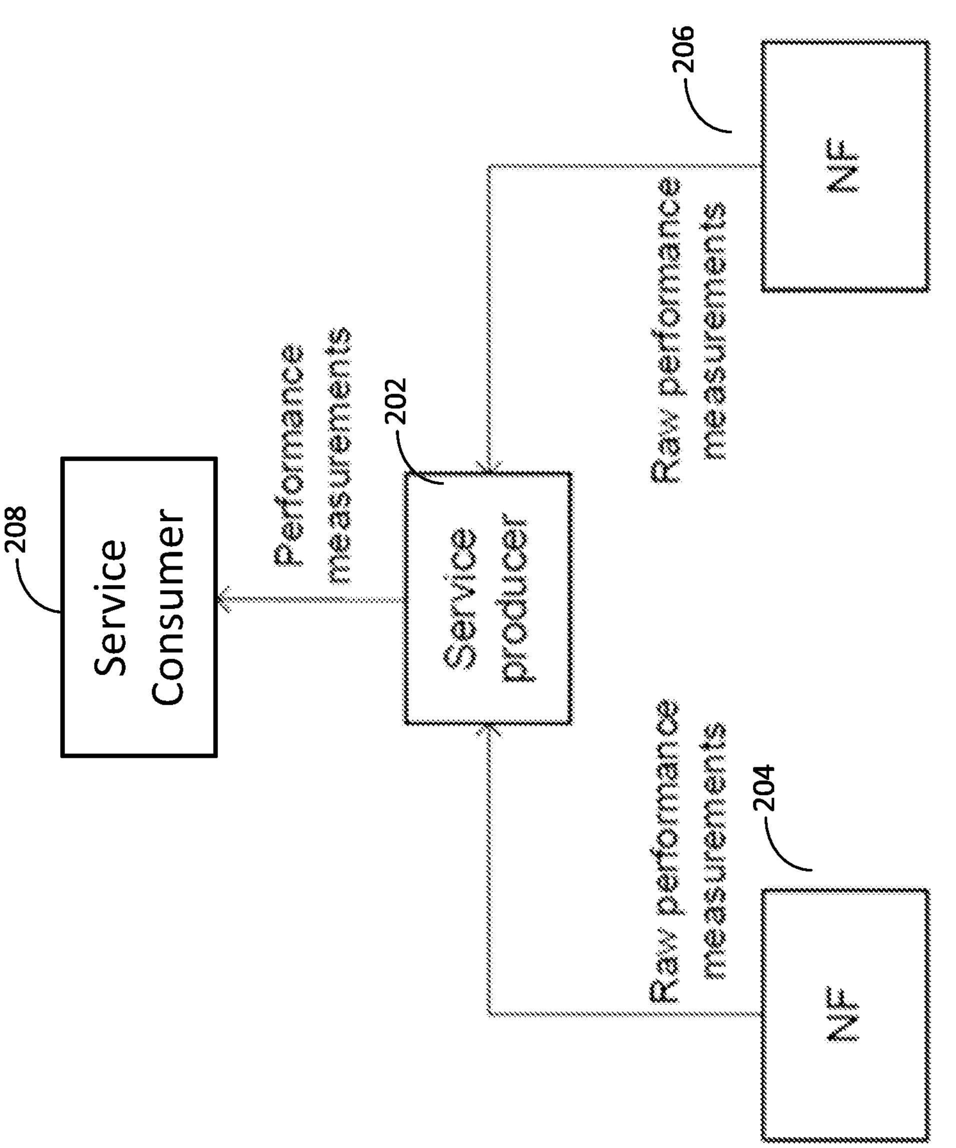
FIG. 2 depicts an illustrative schematic diagram for performance measurements, in accordance with one or more example embodiments of the present disclosure.

FIG. 2 depicts an illustrative schematic diagram for performance measurements, in accordance with one or more example embodiments of the present disclosure.

5G core networks are based on service-based architecture (SBA), which is centered around network function (NF) services. Each NF can register itself and its supported services to a Network Repository Function (NRF), which is used by other NFs for the discovery of NF instances and their services.

In one or more embodiments, a performance measurements system may facilitate a 5G performance measurements generation mechanism. For example, the generation of performance measurements for NEF. A service producer 202 collects the raw performance measurements from NFs (e.g., NFs 204 and 206), and then generates the performance measurements for the NFs for their consumers (e.g., service consumer 208).

An example of such consumers may be a management service consumer. A fundamental building block of the service based management architecture is the management service. A management service is a set of offered capabilities for management and orchestration of network and services. The entity producing a management service is called management service producer. The entity consuming a management service is called management service consumer. A management service provided by a management service producer can be consumed by any entity with appropriate authorisation and authentication. A management service producer offers its services via a standardized service interface composed of individually specified management service components.

FIGS. 3A-3B depict illustrative schematic diagrams for performance measurements, in accordance with one or more example embodiments of the present disclosure.

In one or more embodiments, the NF is NEF, and the Service producer may be implemented within the NF or in a separate management system.

In one or more embodiments, a performance measurements system may facilitate Measurements. For example, Performance measurements for NEF, where the measurement provides the number of AF sessions with QoS.

In one or more embodiments, a performance measurements system may facilitate measurement for a number of Creation of AF session with QoS. For example, a number of AF session with QoS creation requests. This measurement provides the number of AF session with QoS creation requests received by the NEF. The receipt of an Nnef_AFsessionWithQoS_Create request by the NEF from an NF service consumer (e.g., an AF) triggers the NEF to generate a measurement that generates a value of a cumulative counter (CC). Whenever the NEF receives this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is AFQ.CreateReq. This is a network resource model labeled as NEFFunction. This measurement is important because it provides a window into the measurement of success rate to evaluate the performance of the NEF. This provides clarity on the number of requests received by the NEF.

In one or more embodiments, a performance measurements system may facilitate measurement for a number of successful AF session with QoS creations. This measurement provides the number of successful AF session with QoS creations at the NEF. The transmission of an Nnef_AFsessionWithQoS_Create response by the NEF to an NF service consumer (e.g., an AF) indicating a successful AF session with QoS creation triggers the NEF to generate a measurement that generates a value of a cumulative counter (CC). Whenever the NEF sends this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is AFQ.CreateSucc. This is a network resource model labeled as NEFFunction.

In one or more embodiments, a performance measurements system may facilitate measurement for a number of failed AF session with QoS creations. This measurement provides the number of failed AF session with QoS creations at the NEF. The transmission of an Nnef_AFsessionWithQoS_Create response by the NEF to an AF indicating a failed AF session with QoS creation, each message triggers the NEF to increment the relevant subcounter (e.g., CC) per failure cause by 1. Each counter is an integer value. Whenever the NEF sends this message, it will trigger the NEF to make the measurement. The counter may calculated during a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is AFQ.CreateFail.cause, where cause indicates the failure cause of the AF session with QoS creation. This is a network resource model labeled as NEFFunction.

In one or more embodiments, a performance measurements system may facilitate measurement for a notification of AF session with QoS. For example, a number of AF session with QoS notifications. This measurement provides the number of AF session with QoS notifications sent by the NEF to AF. The transmission of an Nnef_AFsessionWithQoS_Notify message by the NEF to an NF service consumer (e.g., an AF) triggers the NEF to generate a measurement that generates a value of a cumulative counter (CC). Whenever the NEF transmits this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is AFQ.NbrNotify. This is a network resource model labeled as NEFFunction.

In one or more embodiments, a performance measurements system may facilitate measurement for a background data transfer policy application. For example, measurement for a number of background data transfer policy application requests. This measurement provides the number of background data transfer policy application requests received by the NEF from AF. The Receipt by the NEF of an Nnef_ApplyPolicy_Create request message from an NF service consumer (e.g., an AF) triggers the NEF to generate a measurement that generates a value of a cumulative counter (CC). Whenever the NEF receives this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyCreatReq. This is a network resource model labeled as NEFFunction.

In one or more embodiments, a performance measurements system may facilitate measurement for a number of successful background data transfer policy applications. This measurement provides the number of successful background data transfer policy applications by the NEF. The transmission by the NEF of an Nnef_ApplyPolicy_Create response message to session management function (SMF) indicating a successful background data transfer policy application triggers the NEF to generate a measurement that generates a value of a cumulative counter (CC). Whenever the NEF transmits this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyCreatSucc. This is a network resource model labeled as NEFFunction.

In one or more embodiments, a performance measurements system may facilitate measurement for a Number of failed background data transfer policy applications. This measurement provides the number of failed background data transfer policy applications by the NEF. Transmission by the NEF of an Nnef_ApplyPolicy_Create response message to AF indicating a failed background data transfer policy application, where each message increments the relevant subcounter per failure cause by 1. This triggers the NEF to generate a measurement that generates a value of a cumulative counter (CC). Whenever the NEF transmits this message, it will trigger the NEF to make the measurement. Each measurement is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyCreatFail.cause, where cause indicates the failure cause of the background data transfer policy application. This is a network resource model labeled as NEFFunction.

In one or more embodiments, a performance measurements system may facilitate measurement for a Number of background data transfer policy update requests. This measurement provides the number of background data transfer policy update requests received by the NEF from AF. Receipt by the NEF of an Nnef_ApplyPolicy_Update request message from AF triggers the NEF to generate a measurement that generates a value of a cumulative counter (CC). Whenever the NEF receives this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyUpdateReq. This is a network resource model labeled as NEFFunction.

In one or more embodiments, a performance measurements system may facilitate measurement for a Number of successful background data transfer policy updates. This measurement provides the number of successful background data transfer policy updates by the NEF. Transmission by the NEF of an Nnef_ApplyPolicy_Update response message to AF indicating a successful background data transfer policy update triggers the NEF to generate a measurement that generates a value of a cumulative counter (CC). Whenever the NEF receives this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyUpdateReq. This is a network resource model labeled as NEFFunction.

In one or more embodiments, a performance measurements system may facilitate measurement for a Number of failed background data transfer policy updates. This measurement provides the number of failed background data transfer policy updates by the NEF. Transmission by the NEF of an Nnef_ApplyPolicy_Update response message to AF indicating a failed background data transfer policy update, where each message increments the relevant counter/subcounter (e.g., CC) per failure cause by 1. This triggers the NEF to generate a measurement that generates a value of a cumulative counter (CC). Whenever the NEF transmits this message, it will trigger the NEF to make the measurement. Each measurement is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyUpdateFail.cause, where cause indicates the failure cause of the failed background data transfer policy update. This is a network resource model labeled as NEFFunction.

In one or more embodiments, a performance measurements system may facilitate measurement for a Number of background data transfer policy deletion requests. This measurement provides the number of background data transfer policy deletion requests received by the NEF from AF. Receipt by the NEF of an Nnef_ApplyPolicy_Delete request message from AF triggers the NEF to generate a measurement that generates a value of a cumulative counter (CC). Whenever the NEF receives this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyDelReq. This is a network resource model labeled as NEFFunction.

In one or more embodiments, a performance measurements system may facilitate measurement for a Number of successful background data transfer policy deletions. This measurement provides the number of successful background data transfer policy deletions by the NEF. Transmission by the NEF of an Nnef_ApplyPolicy_Delete response message to AF indicating a successful background data transfer policy deletion triggers the NEF to generate a measurement that generates a value of a cumulative counter (CC). Whenever the NEF transmits this message, it will trigger the NEF to make the measurement. The value of the CC is a single integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyDelSucc. This is a network resource model labeled as NEFFunction.

In one or more embodiments, a performance measurements system may facilitate measurement for a Number of failed background data transfer policy deletions. This measurement provides the number of failed background data transfer policy deletions by the NEF. Transmission by the NEF of an Nnef_ApplyPolicy_Delete response message to AF indicating a failed background data transfer policy deletion, where each message increments the relevant counter/subcounter (e.g., CC) per failure cause by 1. This triggers the NEF to generate a measurement that generates a value of a cumulative counter (CC). Whenever the NEF transmits this message, it will trigger the NEF to make the measurement. Each measurement is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is BDTP.NbrApplyDelFail.cause, where cause indicates the failure cause of the failed background data transfer policy deletion. This is a network resource model labeled as NEFFunction.

In one or more embodiments, a performance measurements system may facilitate measurement for UCMF provisioning. For example, measurement for a number of UCMF dictionary entry creation requests. This measurement provides the number of UCMF dictionary entry creation requests received by the NEF. Receipt of an Nnef_UCMF-Provisioning_Create request by the NEF from an NF service consumer (e.g., an AF) triggers the NEF to generate a measurement that generates a value of a cumulative counter (CC). Whenever the NEF receives this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryCreateReq. This is a network resource model labeled as NEFFunction.

In one or more embodiments, a performance measurements system may facilitate measurement for a Number of successful UCMF dictionary entry creations. This measurement provides the number of successful UCMF dictionary entry creations at the NEF. Transmission of an Nnef_UCMFProvisioning_Create response by the NEF to an AF indicating a successful UCMF dictionary entry creation triggers the NEF to generate a measurement that generates a value of a cumulative counter (CC). Whenever the NEF transmits this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryCreateSucc. This is a network resource model labeled as NEFFunction.

In one or more embodiments, a performance measurements system may facilitate measurement for a Number of failed UCMF dictionary entry creations. This measurement provides the number of failed UCMF dictionary entry creations at the NEF. Transmission of an Nnef_UCMFProvisioning_Create response by the NEF to an AF indicating a failed UCMF dictionary entry creation, where each message increments the relevant counter/subcounter (e.g., CC) per failure cause by 1. This triggers the NEF to generate a measurement that generates a value of a cumulative counter (CC). Whenever the NEF transmits this message, it will trigger the NEF to make the measurement. Each measurement is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryCreateFail.cause, where cause indicates the failure cause of the UCMF dictionary entry creation. This is a network resource model labeled as NEFFunction.

In one or more embodiments, a performance measurements system may facilitate measurement for a Number of UCMF dictionary entry deletion requests. This measurement provides the number of UCMF dictionary entry deletion requests received by the NEF. Receipt of an Nnef_UCMF-Provisioning_Delete request by the NEF from an AF triggers the NEF to generate a measurement that generates a value of a cumulative counter (CC). Whenever the NEF transmits this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryDelReq. This is a network resource model labeled as NEFFunction.

In one or more embodiments, a performance measurements system may facilitate measurement for a Number of successful UCMF dictionary entry deletions. This measurement provides the number of successful UCMF dictionary entry deletions at the NEF. Transmission of an Nnef_UCMFProvisioning_Delete response by the NEF to an AF indicating a successful UCMF dictionary entry deletion triggers the NEF to generate a measurement that generates a value of a cumulative counter (CC). Whenever the NEF transmits this message, it will trigger the NEF to make the measurement. The value of the CC is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryDelSucc. This is a network resource model labeled as NEFFunction.

In one or more embodiments, a performance measurements system may facilitate measurement for a Number of failed UCMF dictionary entry deletions. This measurement provides the number of failed UCMF dictionary entry deletions at the NEF. Transmission of an Nnef_UCMFProvisioning_Delete response by the NEF to an AF indicating a failed UCMF dictionary entry deletion, where each message increments the relevant counter/subcounter (e.g., CC) per failure cause by 1. This triggers the NEF to generate a measurement that generates a value of a cumulative counter (CC). Whenever the NEF transmits this message, it will trigger the NEF to make the measurement. Each measurement is an integer value. There may be a collection period during which the CC is calculated. The collection period may be a predetermined time such as five minutes or any other time. The NEF will provide the counter value (CC) for every collection period. At every correction period, the initial CC value will be reset to zero. That means the NEF will only report the events within the collection period and not from before. The label of this NEF measurement is UCM.EntryDelFail.cause, where cause indicates the failure cause of the UCMF dictionary entry deletion. This is a network resource model labeled as NEFFunction.

It is understood that the above descriptions are for purposes of illustration and are not meant to be limiting.

Figure 4:
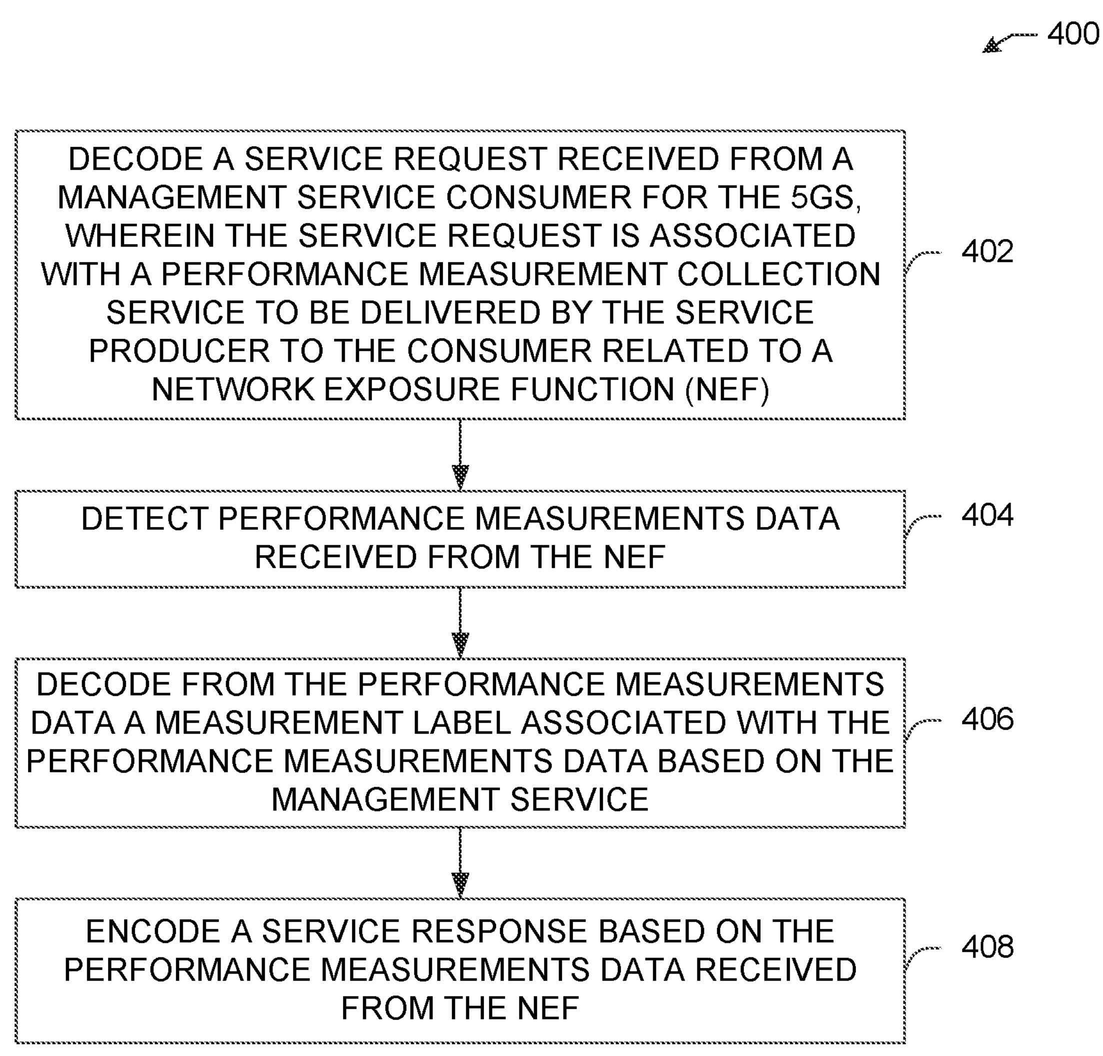
FIG. 4 illustrates a flow diagram of a process for an illustrative performance measurements system, in accordance with one or more example embodiments of the present disclosure.
Figure 5:
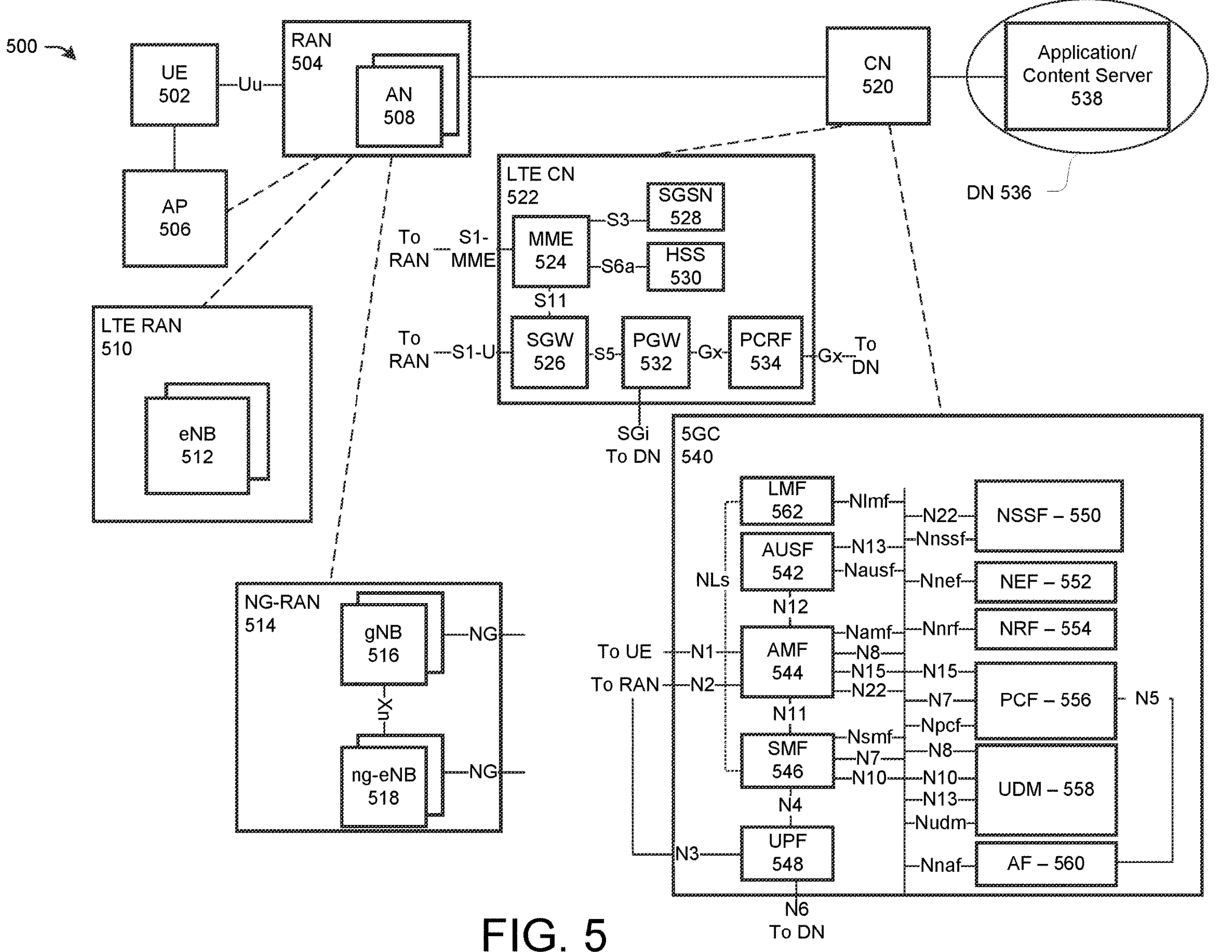
FIG. 5 illustrates an example network architecture, in accordance with one or more example embodiments of the present disclosure.
Figure 6:
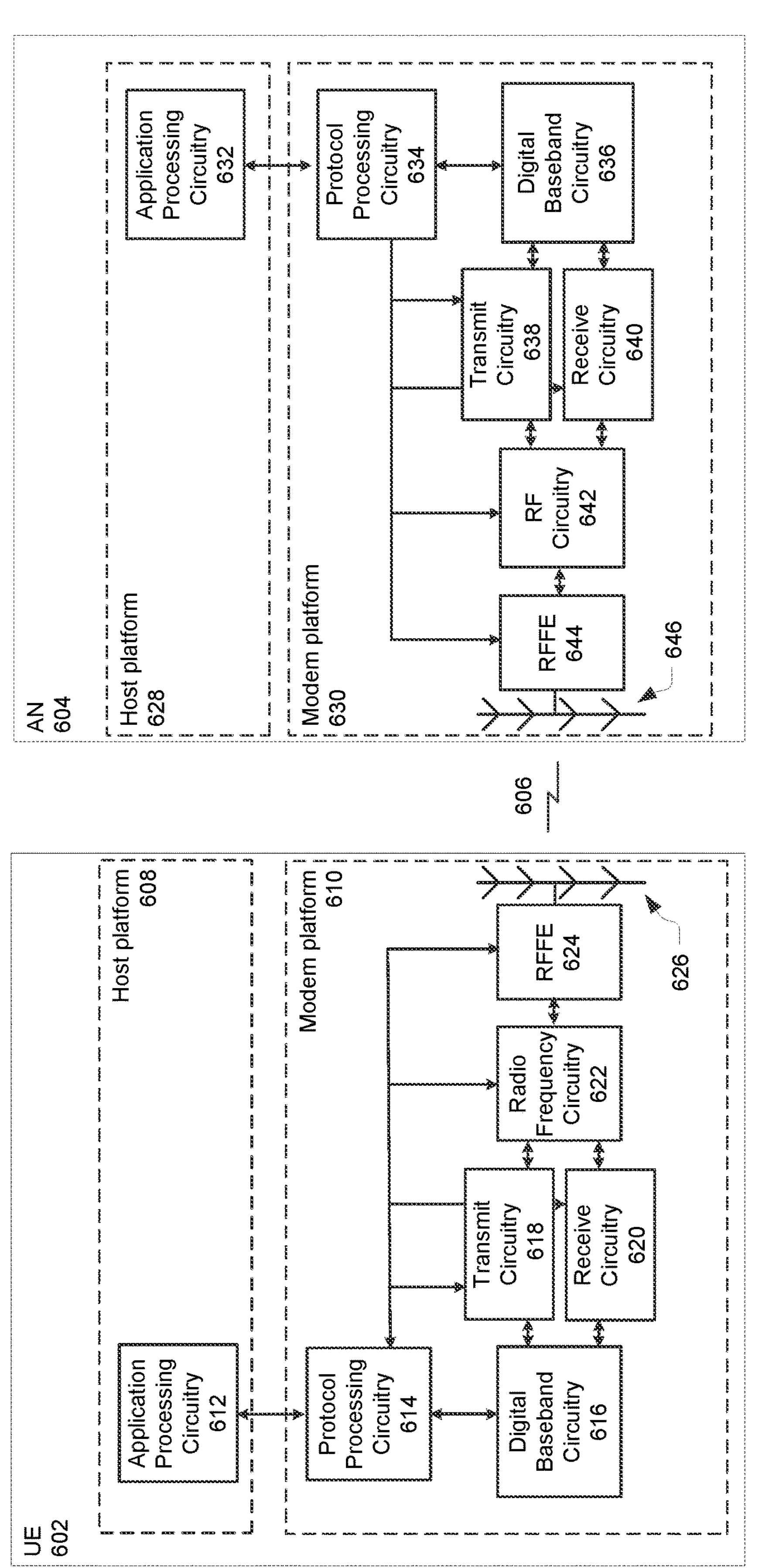
FIG. 6 schematically illustrates a wireless network, in accordance with one or more example embodiments of the present disclosure.
Figure 7:
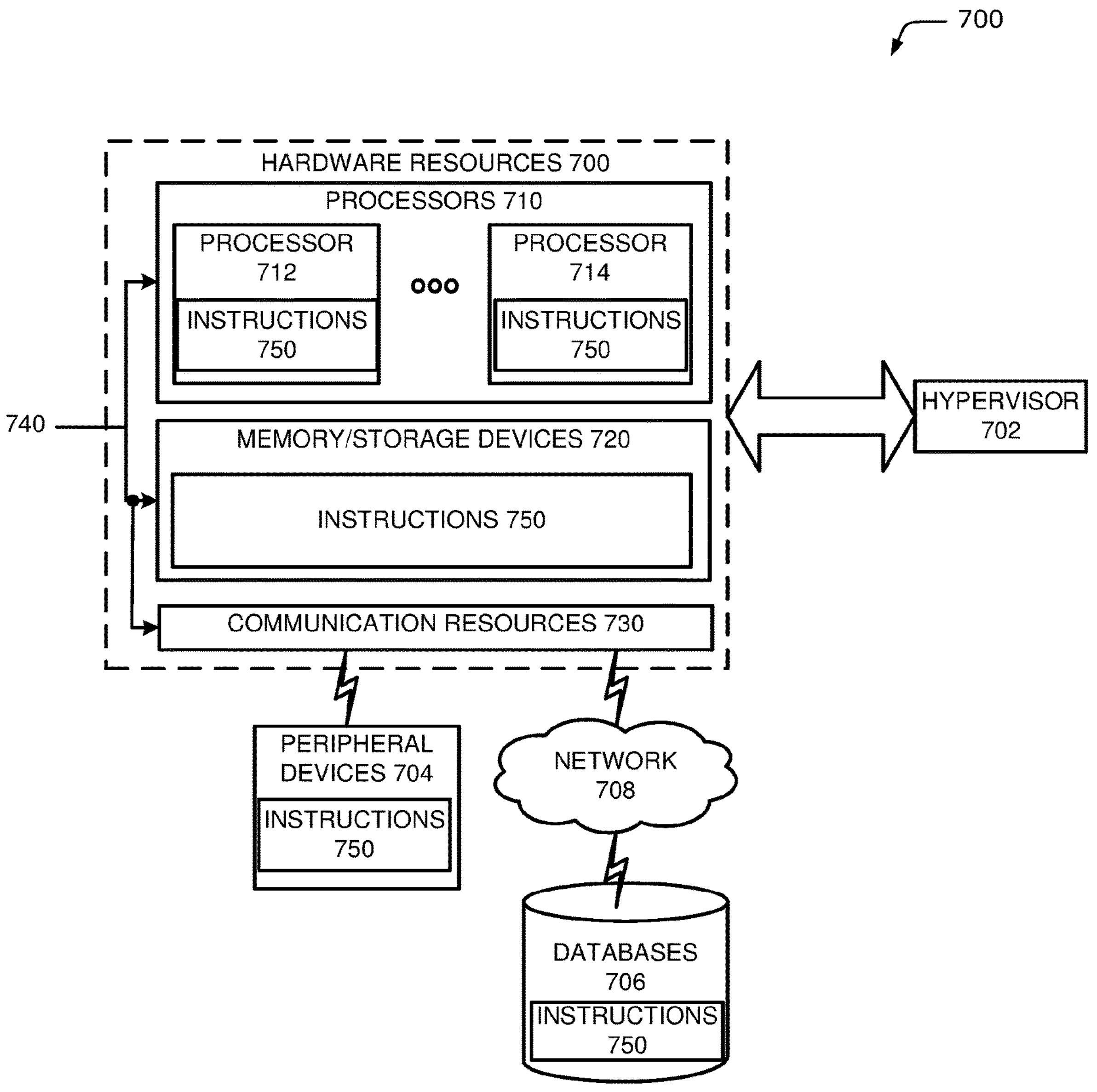
FIG. 7 illustrates components of a computing device, in accordance with one or more example embodiments of the present disclosure.

In some embodiments, the electronic device(s), network(s), system(s), chip(s) or component(s), or portions or implementations thereof, of FIGS. 5-7, or some other figure herein, may be configured to perform one or more processes, techniques, or methods as described herein, or portions thereof. One such process is depicted in FIG. 4.

For example, the process may include, at 402, decoding a service request received from a service consumer for the 5GS, wherein the service request is associated with a performance measurement collection service to be delivered by the service producer to the service consumer related to a network exposure function (NEF).

The process further includes, at 404, detecting performance measurements data received from the NEF.

The process further includes, at 406, decoding from the performance measurements data a measurement label associated with the performance measurements data based on the service request.

The process further includes, at 408, encoding a service response based on the performance measurements data received from the NEF.

In one or more embodiments, the decoding the service request triggers the NEF to initiate a generation and delivery of the performance measurements data.

In one or more embodiments, the performance measurement is based on a number of application function (AF) session with quality of service (QoS) creation requests, a number of successful AF session with QoS creation, a number of failed AF session with QoS creation, or a number of AF session with QoS notifications.

In one or more embodiments, the performance measurement is based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

In one or more embodiments, the performance measurement is based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions.

In one or more embodiments, the service producer is outside the NEF in a separate management system or inside the NEF.

In one or more embodiments, generating a first performance measurement comprises the initiating a cumulative counter for measurements during a collection period.

In one or more embodiments, the number of AF session with QoS creation requests is cumulated on receipt of an Nnef_AFsessionWithQoS_Create request by the NEF from an AF, the number of successful AF session with QoS creations is cumulated on transmission of an Nnef_AFsessionWithQoS_Create response by the NEF to an AF indicating a successful AF session with QoS creation, the number of failed AF session with QoS creations is cumulated on transmission of an Nnef_AFsessionWithQoS_Create response by the NEF to an AF indicating a failed AF session with QoS creation and each message increments a relevant subcounter per failure cause by 1, and the number of AF session with QoS notifications is cumulated on transmission of an Nnef_AFsessionWithQoS_Notify message by the NEF to an AF.

In one or more embodiments, the number of background data transfer policy application requests is cumulated on receipt by the NEF of an Nnef_ApplyPolicy_Create request message from AF, the number of successful background data transfer policy applications is cumulated on transmission by the NEF of an Nnef_ApplyPolicy_Create response message to SMF indicating a successful background data transfer policy application, the number of failed background data transfer policy applications is cumulated on transmission by the NEF of an Nnef_ApplyPolicy_Create response message to AF indicating a failed background data transfer policy application and each message increments a relevant subcounter per failure cause by 1, the number of background data transfer policy update requests is cumulated on receipt by the NEF of an Nnef_ApplyPolicy_Update request message from AF, the number of successful background data transfer policy updates is cumulated on transmission by the NEF of an Nnef_ApplyPolicy_Update response message to AF indicating a successful background data transfer policy update, the number of failed background data transfer policy updates is cumulated on transmission by the NEF of an Nnef_ApplyPolicy_Update response message to AF indicating a failed background data transfer policy update and each message increments a relevant subcounter per failure cause by 1, the number of background data transfer policy deletion requests is cumulated on receipt by the NEF of an Nnef_ApplyPolicy_Delete request message from AF, the number of successful background data transfer policy deletions is cumulated on transmission by the NEF of an Nnef_ApplyPolicy_Delete response message to AF indicating a successful background data transfer policy deletion, and the number of failed background data transfer policy deletions is cumulated on transmission by the NEF of an Nnef_ApplyPolicy_Delete response message to AF indicating a failed background data transfer policy deletion and each message increments a relevant subcounter per failure cause by 1.

In one or more embodiments, the number of UCMF dictionary entry creation requests is cumulated on receipt of an Nnef_UCMFProvisioning_Create request by the NEF from an AF, the number of successful UCMF dictionary entry creations is cumulated on transmission of an Nnef_UCMFProvisioning_Create response by the NEF to an AF indicating a successful UCMF dictionary entry creation, the number of failed UCMF dictionary entry creations is cumulated on transmission of an Nnef_UCMFProvisioning_Create response by the NEF to an AF indicating a failed UCMF dictionary entry creation and each message increments a relevant subcounter per failure cause by 1, the number of UCMF dictionary entry deletion requests is cumulated on receipt of an Nnef_UCMFProvisioning_Delete request by the NEF from an AF, the number of successful UCMF dictionary entry deletions is cumulated on transmission of an Nnef_UCMFProvisioning_Delete response by the NEF to an AF indicating a successful UCMF dictionary entry deletion, and the number of failed UCMF dictionary entry deletions is cumulated on transmission of an Nnef_UCMFProvisioning_Delete response by the NEF to an AF indicating a failed UCMF dictionary entry deletion and each message increments a relevant subcounter per failure cause by 1.

In one or more embodiments, an initial value of the cumulative counter is set to zero at a beginning of every collection period.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

It is understood that the above descriptions are for purposes of illustration and are not meant to be limiting.

FIGS. 5-7 illustrate various systems, devices, and components that may implement aspects of disclosed embodiments.

FIG. 5 illustrates an example network architecture 500 according to various embodiments. The network 500 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 500 includes a UE 502, which is any mobile or non-mobile computing device designed to communicate with a RAN 504 via an over-the-air connection. The UE 502 is communicatively coupled with the RAN 504 by a Uu interface, which may be applicable to both LTE and NR systems. Examples of the UE 502 include, but are not limited to, a smartphone, tablet computer, wearable computer, desktop computer, laptop computer, in-vehicle infotainment system, in-car entertainment system, instrument cluster, head-up display (HUD) device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, machine-to-machine (M2M), device-to-device (D2D), machine-type communication (MTC) device, Internet of Things (IoT) device, and/or the like. The network 500 may include a plurality of UEs 502 coupled directly with one another via a D2D, ProSe, PC5, and/or sidelink (SL) interface. These UEs 502 may be M2M/D2D/MTC/IoT devices and/or vehicular systems that communicate using physical sidelink channels such as, but not limited to, PSBCH, PSDCH, PSSCH, PSCCH, PSFCH, etc. The UE 502 may perform blind decoding attempts of SL channels/links according to the various embodiments herein.

In some embodiments, the UE 502 may additionally communicate with an AP 506 via an over-the-air (OTA) connection. The AP 506 manages a WLAN connection, which may serve to offload some/all network traffic from the RAN 504. The connection between the UE 502 and the AP 506 may be consistent with any IEEE 802.11 protocol. Additionally, the UE 502, RAN 504, and AP 506 may utilize cellular-WLAN aggregation/integration (e.g., LWA/LWIP). Cellular-WLAN aggregation may involve the UE 502 being configured by the RAN 504 to utilize both cellular radio resources and WLAN resources.

The RAN 504 includes one or more access network nodes (ANs) 508. The ANs 508 terminate air-interface(s) for the UE 502 by providing access stratum protocols including RRC, PDCP, RLC, MAC, and PHY/L1 protocols. In this manner, the AN 508 enables data/voice connectivity between CN 520 and the UE 502. The ANs 508 may be a macrocell base station or a low power base station for providing femtocells, picocells or other like cells having smaller coverage areas, smaller user capacity, or higher bandwidth compared to macrocells; or some combination thereof. In these implementations, an AN 508 be referred to as a BS, gNB, RAN node, eNB, ng-eNB, NodeB, RSU, TRxP, etc.

One example implementation is a "CU/DU split" architecture where the ANs 508 are embodied as a gNB-Central Unit (CU) that is communicatively coupled with one or more gNB-Distributed Units (DUs), where each DU may be communicatively coupled with one or more Radio Units (RUs) (also referred to as RRHs, RRUs, or the like) (see e.g., 3GPP TS 38.401 v16.1.0 (2020 March)). In some implementations, the one or more RUs may be individual RSUs. In some implementations, the CU/DU split may include an ng-eNB-CU and one or more ng-eNB-DUs instead of, or in addition to, the gNB-CU and gNB-DUs, respectively. The ANs 508 employed as the CU may be implemented in a discrete device or as one or more software entities running on server computers as part of, for example, a virtual network including a virtual Base Band Unit (BBU) or BBU pool, cloud RAN (CRAN), Radio Equipment Controller (REC), Radio Cloud Center (RCC), centralized RAN (C-RAN), virtualized RAN (vRAN), and/or the like (although these terms may refer to different implementation concepts). Any other type of architectures, arrangements, and/or configurations can be used.

The plurality of ANs may be coupled with one another via an X2 interface (if the RAN 504 is an LTE RAN or Evolved Universal Terrestrial Radio Access Network (E-UTRAN) 510) or an Xn interface (if the RAN 504 is a NG-RAN 514). The X2/Xn interfaces, which may be separated into control/user plane interfaces in some embodiments, may allow the ANs to communicate information related to handovers, data/context transfers, mobility, load management, interference coordination, etc.

The ANs of the RAN 504 may each manage one or more cells, cell groups, component carriers, etc. to provide the UE 502 with an air interface for network access. The UE 502 may be simultaneously connected with a plurality of cells provided by the same or different ANs 508 of the RAN 504. For example, the UE 502 and RAN 504 may use carrier aggregation to allow the UE 502 to connect with a plurality of component carriers, each corresponding to a Pcell or Scell. In dual connectivity scenarios, a first AN 508 may be a master node that provides an MCG and a second AN 508 may be secondary node that provides an SCG. The first/second ANs 508 may be any combination of eNB, gNB, ng-eNB, etc.

The RAN 504 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 502 or AN 508 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 504 may be an E-UTRAN 510 with one or more eNBs 512. The an E-UTRAN 510 provides an LTE air interface (Uu) with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 504 may be an next generation (NG)-RAN 514 with one or more gNB 516 and/or on or more ng-eNB 518. The gNB 516 connects with 5G-enabled UEs 502 using a 5G NR interface. The gNB 516 connects with a 5GC 540 through an NG interface, which includes an N2 interface or an N3 interface. The ng-eNB 518 also connects with the 5GC 540 through an NG interface, but may connect with a UE 502 via the Uu interface. The gNB 516 and the ng-eNB 518 may connect with each other over an Xn interface.

In some embodiments, the NG interface may be split into two parts, an NG user plane (NG-U) interface, which carries traffic data between the nodes of the NG-RAN 514 and a UPF 548 (e.g., N3 interface), and an NG control plane (NG-C) interface, which is a signaling interface between the nodes of the NG-RAN 514 and an AMF 544 (e.g., N2 interface).

The NG-RAN 514 may provide a 5G-NR air interface (which may also be referred to as a Uu interface) with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

The 5G-NR air interface may utilize BWPs for various purposes. For example, BWP can be used for dynamic adaptation of the SCS. For example, the UE 502 can be configured with multiple BWPs where each BWP configuration has a different SCS. When a BWP change is indicated to the UE 502, the SCS of the transmission is changed as well. Another use case example of BWP is related to power saving. In particular, multiple BWPs can be configured for the UE 502 with different amount of frequency resources (e.g., PRBs) to support data transmission under different traffic loading scenarios. A BWP containing a smaller number of PRBs can be used for data transmission with small traffic load while allowing power saving at the UE 502 and in some cases at the gNB 516. A BWP containing a larger number of PRBs can be used for scenarios with higher traffic load.

The RAN 504 is communicatively coupled to CN 520 that includes network elements and/or network functions (NFs) to provide various functions to support data and telecommunications services to customers/subscribers (e.g., UE 502). The components of the CN 520 may be implemented in one physical node or separate physical nodes. In some embodiments, NFV may be utilized to virtualize any or all of the functions provided by the network elements of the CN 520 onto physical compute/storage resources in servers, switches, etc. A logical instantiation of the CN 520 may be referred to as a network slice, and a logical instantiation of a portion of the CN 520 may be referred to as a network sub-slice.

The CN 520 may be an LTE CN 522 (also referred to as an Evolved Packet Core (EPC) 522). The EPC 522 may include MME 524, SGW 526, SGSN 528, HSS 530, PGW 532, and PCRF 534 coupled with one another over interfaces (or "reference points") as shown. The NFs in the EPC 522 are briefly introduced as follows.

The MME 524 implements mobility management functions to track a current location of the UE 502 to facilitate paging, bearer activation/deactivation, handovers, gateway selection, authentication, etc.

The SGW 526 terminates an S1 interface toward the RAN 510 and routes data packets between the RAN 510 and the EPC 522. The SGW 526 may be a local mobility anchor point for inter-RAN node handovers and also may provide an anchor for inter-3GPP mobility. Other responsibilities may include lawful intercept, charging, and some policy enforcement.

The SGSN 528 tracks a location of the UE 502 and performs security functions and access control. The SGSN 528 also performs inter-EPC node signaling for mobility between different RAT networks; PDN and S-GW selection as specified by MME 524; MME 524 selection for handovers; etc. The S3 reference point between the MME 524 and the SGSN 528 enable user and bearer information exchange for inter-3GPP access network mobility in idle/active states.

The HSS 530 includes a database for network users, including subscription-related information to support the network entities' handling of communication sessions. The HSS 530 can provide support for routing/roaming, authentication, authorization, naming/addressing resolution, location dependencies, etc. An S6a reference point between the HSS 530 and the MME 524 may enable transfer of subscription and authentication data for authenticating/authorizing user access to the EPC 520.

The PGW 532 may terminate an SGi interface toward a data network (DN) 536 that may include an application (app)/content server 538. The PGW 532 routes data packets between the EPC 522 and the data network 536. The PGW 532 is communicatively coupled with the SGW 526 by an S5 reference point to facilitate user plane tunneling and tunnel management. The PGW 532 may further include a node for policy enforcement and charging data collection (e.g., PCEF). Additionally, the SGi reference point may communicatively couple the PGW 532 with the same or different data network 536. The PGW 532 may be communicatively coupled with a PCRF 534 via a Gx reference point.

The PCRF 534 is the policy and charging control element of the EPC 522. The PCRF 534 is communicatively coupled to the app/content server 538 to determine appropriate QoS and charging parameters for service flows. The PCRF 532 also provisions associated rules into a PCEF (via Gx reference point) with appropriate TFT and QCI.

The CN 520 may be a 5GC 540 including an AUSF 542, AMF 544, SMF 546, UPF 548, NSSF 550, NEF 552, NRF 554, PCF 556, UDM 558, and AF 560 coupled with one another over various interfaces as shown. The NFs in the 5GC 540 are briefly introduced as follows.

The AUSF 542 stores data for authentication of UE 502 and handle authentication-related functionality. The AUSF 542 may facilitate a common authentication framework for various access types.

The AMF 544 allows other functions of the 5GC 540 to communicate with the UE 502 and the RAN 504 and to subscribe to notifications about mobility events with respect to the UE 502. The AMF 544 is also responsible for registration management (e.g., for registering UE 502), connection management, reachability management, mobility management, lawful interception of AMF-related events, and access authentication and authorization. The AMF 544 provides transport for SM messages between the UE 502 and the SMF 546, and acts as a transparent pro4 for routing SM messages. AMF 544 also provides transport for SMS messages between UE 502 and an SMSF. AMF 544 interacts with the AUSF 542 and the UE 502 to perform various security anchor and context management functions. Furthermore, AMF 544 is a termination point of a RAN-CP interface, which includes the N2 reference point between the RAN 504 and the AMF 544. The AMF 544 is also a termination point of NAS (N1) signaling, and performs NAS ciphering and integrity protection.

AMF 544 also supports NAS signaling with the UE 502 over an N3IWF interface. The N3IWF provides access to untrusted entities. N3IWF may be a termination point for the N2 interface between the (R)AN 504 and the AMF 544 for the control plane, and may be a termination point for the N3 reference point between the (R)AN 514 and the 548 for the user plane. As such, the AMF 544 handles N2 signaling from the SMF 546 and the AMF 544 for PDU sessions and QoS, encapsulate/de-encapsulate packets for IPSec and N3 tunnelling, marks N3 user-plane packets in the uplink, and enforces QoS corresponding to N3 packet marking taking into account QoS requirements associated with such marking received over N2. N3IWF may also relay UL and DL control-plane NAS signaling between the UE 502 and AMF 544 via an N1 reference point between the UE 502 and the AMF 544, and relay uplink and downlink user-plane packets between the UE 502 and UPF 548. The N3IWF also provides mechanisms for IPsec tunnel establishment with the UE 502. The AMF 544 may exhibit an Namf service-based interface, and may be a termination point for an N14 reference point between two AMFs 544 and an N17 reference point between the AMF 544 and a 5G-EIR (not shown by FIG. 5).

The SMF 546 is responsible for SM (e.g., session establishment, tunnel management between UPF 548 and AN 508); UE IP address allocation and management (including optional authorization); selection and control of UP function; configuring traffic steering at UPF 548 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 544 over N2 to AN 508; and determining SSC mode of a session. SM refers to management of a PDU session, and a PDU session or "session" refers to a PDU connectivity service that provides or enables the exchange of PDUs between the UE 502 and the DN 536.

The UPF 548 acts as an anchor point for intra-RAT and inter-RAT mobility, an external PDU session point of interconnect to data network 536, and a branching point to support multi-homed PDU session. The UPF 548 also performs packet routing and forwarding, packet inspection, enforces user plane part of policy rules, lawfully intercept packets (UP collection), performs traffic usage reporting, perform QoS handling for a user plane (e.g., packet filtering, gating, UL/DL rate enforcement), performs uplink traffic verification (e.g., SDF-to-QoS flow mapping), transport level packet marking in the uplink and downlink, and performs downlink packet buffering and downlink data notification triggering. UPF 548 may include an uplink classifier to support routing traffic flows to a data network.

The NSSF 550 selects a set of network slice instances serving the UE 502. The NSSF 550 also determines allowed NSSAI and the mapping to the subscribed S-NSSAIs, if needed. The NSSF 550 also determines an AMF set to be used to serve the UE 502, or a list of candidate AMFs 544 based on a suitable configuration and possibly by querying the NRF 554. The selection of a set of network slice instances for the UE 502 may be triggered by the AMF 544 with which the UE 502 is registered by interacting with the NSSF 550; this may lead to a change of AMF 544. The NSSF 550 interacts with the AMF 544 via an N22 reference point; and may communicate with another NSSF in a visited network via an N31 reference point (not shown).

The NEF 552 securely exposes services and capabilities provided by 3GPP NFs for third party, internal exposure/re-exposure, AFs 560, edge computing or fog computing systems (e.g., edge compute node, etc. In such embodiments, the NEF 552 may authenticate, authorize, or throttle the AFs. NEF 552 may also translate information exchanged with the AF 560 and information exchanged with internal network functions. For example, the NEF 552 may translate between an AF-Service-Identifier and an internal 5GC information. NEF 552 may also receive information from other NFs based on exposed capabilities of other NFs. This information may be stored at the NEF 552 as structured data, or at a data storage NF using standardized interfaces. The stored information can then be re-exposed by the NEF 552 to other NFs and AFs, or used for other purposes such as analytics.

The NRF 554 supports service discovery functions, receives NF discovery requests from NF instances, and provides information of the discovered NF instances to the requesting NF instances. NRF 554 also maintains information of available NF instances and their supported services. The NRF 554 also supports service discovery functions, wherein the NRF 554 receives NF Discovery Request from NF instance or an service communication pro4 (SCP) (not shown), and provides information of the discovered NF instances to the NF instance or SCP.

The PCF 556 provides policy rules to control plane functions to enforce them, and may also support unified policy framework to govern network behavior. The PCF 556 may also implement a front end to access subscription information relevant for policy decisions in a UDR of the UDM 558. In addition to communicating with functions over reference points as shown, the PCF 556 exhibit an Npcf service-based interface.

The UDM 558 handles subscription-related information to support the network entities' handling of communication sessions, and stores subscription data of UE 502. For example, subscription data may be communicated via an N8 reference point between the UDM 558 and the AMF 544. The UDM 558 may include two parts, an application front end and a UDR. The UDR may store subscription data and policy data for the UDM 558 and the PCF 556, and/or structured data for exposure and application data (including PFDs for application detection, application request information for multiple UEs 502) for the NEF 552. The Nudr service-based interface may be exhibited by the UDR 221 to allow the UDM 558, PCF 556, and NEF 552 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 558 may exhibit the Nudm service-based interface.

AF 560 provides application influence on traffic routing, provide access to NEF 552, and interact with the policy framework for policy control. The AF 560 may influence UPF 548 (re)selection and traffic routing. Based on operator deployment, when AF 560 is considered to be a trusted entity, the network operator may permit AF 560 to interact directly with relevant NFs. Additionally, the AF 560 may be used for edge computing implementations.

The 5GC 540 may enable edge computing by selecting operator/3rd party services to be geographically close to a point that the UE 502 is attached to the network. This may reduce latency and load on the network. In edge computing implementations, the 5GC 540 may select a UPF 548 close to the UE 502 and execute traffic steering from the UPF 548 to DN 536 via the N6 interface. This may be based on the UE subscription data, UE location, and information provided by the AF 560, which allows the AF 560 to influence UPF (re)selection and traffic routing.

The data network (DN) 536 may represent various network operator services, Internet access, or third party services that may be provided by one or more servers including, for example, application (app)/content server 538. The DN 536 may be an operator external public, a private PDN, or an intra-operator packet data network, for example, for provision of IMS services. In this embodiment, the app server 538 can be coupled to an IMS via an S-CSCF or the I-CSCF. In some implementations, the DN 536 may represent one or more local area DNs (LADNs), which are DNs 536 (or DN names (DNNs)) that is/are accessible by a UE 502 in one or more specific areas. Outside of these specific areas, the UE 502 is not able to access the LADN/DN 536.

Additionally or alternatively, the DN 536 may be an Edge DN 536, which is a (local) Data Network that supports the architecture for enabling edge applications. In these embodiments, the app server 538 may represent the physical hardware systems/devices providing app server functionality and/or the application software resident in the cloud or at an edge compute node that performs server function(s). In some embodiments, the app/content server 538 provides an edge hosting environment that provides support required for Edge Application Server's execution.

In some embodiments, the 5GS can use one or more edge compute nodes to provide an interface and offload processing of wireless communication traffic. In these embodiments, the edge compute nodes may be included in, or co-located with one or more RAN 510, 514. For example, the edge compute nodes can provide a connection between the RAN 514 and UPF 548 in the 5GC 540. The edge compute nodes can use one or more NFV instances instantiated on virtualization infrastructure within the edge compute nodes to process wireless connections to and from the RAN 514 and UPF 548.

The interfaces of the 5GC 540 include reference points and service-based interfaces. The reference points include: N1 (between the UE 502 and the AMF 544), N2 (between RAN 514 and AMF 544), N3 (between RAN 514 and UPF 548), N4 (between the SMF 546 and UPF 548), N5 (between PCF 556 and AF 560), N6 (between UPF 548 and DN 536), N7 (between SMF 546 and PCF 556), N8 (between UDM 558 and AMF 544), N9 (between two UPFs 548), N10 (between the UDM 558 and the SMF 546), N11 (between the AMF 544 and the SMF 546), N12 (between AUSF 542 and AMF 544), N13 (between AUSF 542 and UDM 558), N14 (between two AMFs 544; not shown), N15 (between PCF 556 and AMF 544 in case of a non-roaming scenario, or between the PCF 556 in a visited network and AMF 544 in case of a roaming scenario), N16 (between two SMFs 546; not shown), and N22 (between AMF 544 and NSSF 550). Other reference point representations not shown in FIG. 5 can also be used. The service-based representation of FIG. 5 represents NFs within the control plane that enable other authorized NFs to access their services. The service-based interfaces (SBIs) include: Namf (SBI exhibited by AMF 544), Nsmf (SBI exhibited by SMF 546), Nnef (SBI exhibited by NEF 552), Npcf (SBI exhibited by PCF 556), Nudm (SBI exhibited by the UDM 558), Naf (SBI exhibited by AF 560), Nnrf (SBI exhibited by NRF 554), Nnssf (SBI exhibited by NSSF 550), Nausf (SBI exhibited by AUSF 542). Other service-based interfaces (e.g., Nudr, N5g-eir, and Nudsf) not shown in FIG. 5 can also be used. In some embodiments, the NEF 552 can provide an interface to edge compute nodes 536*x*, which can be used to process wireless connections with the RAN 514.

In some implementations, the system 500 may include an SMSF, which is responsible for SMS subscription checking and verification, and relaying SM messages to/from the UE 502 to/from other entities, such as an SMS-GMSC/IWMSC/SMS-router. The SMS may also interact with AMF 542 and UDM 558 for a notification procedure that the UE 502 is available for SMS transfer (e.g., set a UE not reachable flag, and notifying UDM 558 when UE 502 is available for SMS).

The 5GS may also include an SCP (or individual instances of the SCP) that supports indirect communication (see e.g., 3GPP TS 23.501 section 7.1.1); delegated discovery (see e.g., 3GPP TS 23.501 section 7.1.1); message forwarding and routing to destination NF/NF service(s), communication security (e.g., authorization of the NF Service Consumer to access the NF Service Producer API) (see e.g., 3GPP TS 33.501), load balancing, monitoring, overload control, etc.; and discovery and selection functionality for UDM(s), AUSF(s), UDR(s), PCF(s) with access to subscription data stored in the UDR based on UE's SUPI, SUCI or GPSI (see e.g., 3GPP TS 23.501 section 6.3). Load balancing, monitoring, overload control functionality provided by the SCP may be implementation specific. The SCP may be deployed in a distributed manner. More than one SCP can be present in the communication path between various NF Services. The SCP, although not an NF instance, can also be deployed distributed, redundant, and scalable.

FIG. 6 schematically illustrates a wireless network 600 in accordance with various embodiments. The wireless network 600 may include a UE 602 in wireless communication with an AN 604. The UE 602 and AN 604 may be similar to, and substantially interchangeable with, like-named components described with respect to FIG. 5.

The UE 602 may be communicatively coupled with the AN 604 via connection 606. The connection 606 is illustrated as an air interface to enable communicative coupling, and can be consistent with cellular communications protocols such as an LTE protocol or a 5G NR protocol operating at mmWave or sub-6 GHz frequencies.

The UE 602 may include a host platform 608 coupled with a modem platform 610. The host platform 608 may include application processing circuitry 612, which may be coupled with protocol processing circuitry 614 of the modem platform 610. The application processing circuitry 612 may run various applications for the UE 602 that source/sink application data. The application processing circuitry 612 may further implement one or more layer operations to transmit/receive application data to/from a data network. These layer operations may include transport (for example UDP) and Internet (for example, IP) operations The protocol processing circuitry 614 may implement one or more of layer operations to facilitate transmission or reception of data over the connection 606. The layer operations implemented by the protocol processing circuitry 614 may include, for example, MAC, RLC, PDCP, RRC and NAS operations.

The modem platform 610 may further include digital baseband circuitry 616 that may implement one or more layer operations that are "below" layer operations performed by the protocol processing circuitry 614 in a network protocol stack. These operations may include, for example, PHY operations including one or more of HARQ acknowledgement (ACK) functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 610 may further include transmit circuitry 618, receive circuitry 620, RF circuitry 622, and RF front end (RFFE) 624, which may include or connect to one or more antenna panels 626. Briefly, the transmit circuitry 618 may include a digital-to-analog converter, mixer, intermediate frequency (IF) components, etc.; the receive circuitry 620 may include an analog-to-digital converter, mixer, IF components, etc.; the RF circuitry 622 may include a low-noise amplifier, a power amplifier, power tracking components, etc.; RFFE 624 may include filters (for example, surface/bulk acoustic wave filters), switches, antenna tuners, beamforming components (for example, phase-array antenna components), etc. The selection and arrangement of the components of the transmit circuitry 618, receive circuitry 620, RF circuitry 622, RFFE 624, and antenna panels 626 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 614 may include one or more instances of control circuitry (not shown) to provide control functions for the transmit/receive components.

A UE 602 reception may be established by and via the antenna panels 626, RFFE 624, RF circuitry 622, receive circuitry 620, digital baseband circuitry 616, and protocol processing circuitry 614. In some embodiments, the antenna panels 626 may receive a transmission from the AN 604 by receive-beamforming signals received by a plurality of antennas/antenna elements of the one or more antenna panels 626.

A UE 602 transmission may be established by and via the protocol processing circuitry 614, digital baseband circuitry 616, transmit circuitry 618, RF circuitry 622, RFFE 624, and antenna panels 626. In some embodiments, the transmit components of the UE 604 may apply a spatial filter to the data to be transmitted to form a transmit beam emitted by the antenna elements of the antenna panels 626.

Similar to the UE 602, the AN 604 may include a host platform 628 coupled with a modem platform 630. The host platform 628 may include application processing circuitry 632 coupled with protocol processing circuitry 634 of the modem platform 630. The modem platform may further include digital baseband circuitry 636, transmit circuitry 638, receive circuitry 640, RF circuitry 642, RFFE circuitry 644, and antenna panels 646. The components of the AN 604 may be similar to and substantially interchangeable with like-named components of the UE 602. In addition to performing data transmission/reception as described above, the components of the AN 608 may perform various logical functions that include, for example, RNC functions such as radio bearer management, uplink and downlink dynamic radio resource management, and data packet scheduling.

FIG. 7 illustrates components of a computing device 700 according to some example embodiments, able to read instructions from a machine-readable or computer-readable medium (e.g., a non-transitory machine-readable storage medium) and perform any one or more of the methodologies discussed herein. Specifically, FIG. 7 shows a diagrammatic representation of hardware resources 700 including one or more processors (or processor cores) 710, one or more memory/storage devices 720, and one or more communication resources 730, each of which may be communicatively coupled via a bus 740 or other interface circuitry. For embodiments where node virtualization (e.g., NFV) is utilized, a hypervisor 702 may be executed to provide an execution environment for one or more network slices/sub-slices to utilize the hardware resources 700.

The processors 710 include, for example, processor 712 and processor 714. The processors 710 include circuitry such as, but not limited to one or more processor cores and one or more of cache memory, low drop-out voltage regulators (LDOs), interrupt controllers, serial interfaces such as SPI, I2C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. The processors 710 may be, for example, a central processing unit (CPU), reduced instruction set computing (RISC) processors, Acorn RISC Machine (ARM) processors, complex instruction set computing (CISC) processors, graphics processing units (GPUs), one or more Digital Signal Processors (DSPs) such as a baseband processor, Application-Specific Integrated Circuits (ASICs), an Field-Programmable Gate Array (FPGA), a radio-frequency integrated circuit (RFIC), one or more microprocessors or controllers, another processor (including those discussed herein), or any suitable combination thereof. In some implementations, the processor circuitry 710 may include one or more hardware accelerators, which may be microprocessors, programmable processing devices (e.g., FPGA, complex programmable logic devices (CPLDs), etc.), or the like.

The memory/storage devices 720 may include main memory, disk storage, or any suitable combination thereof. The memory/storage devices 720 may include, but are not limited to, any type of volatile, non-volatile, or semi-volatile memory such as random access memory (RAM), dynamic RAM (DRAM), static RAM (SRAM), synchronous DRAM (SDRAM), erasable programmable read-only memory (EPROM), electrically erasable programmable read-only memory (EEPROM), Flash memory, solid-state storage, phase change RAM (PRAM), resistive memory such as magnetoresistive random access memory (MRAM), etc., and may incorporate three-dimensional (3D) cross-point (XPOINT) memories from Intel® and Micron®. The memory/storage devices 720 may also comprise persistent storage devices, which may be temporal and/or persistent storage of any type, including, but not limited to, non-volatile memory, optical, magnetic, and/or solid state mass storage, and so forth.

The communication resources 730 may include interconnection or network interface controllers, components, or other suitable devices to communicate with one or more peripheral devices 704 or one or more databases 706 or other network elements via a network 708. For example, the communication resources 730 may include wired communication components (e.g., for coupling via USB, Ethernet, Ethernet, Ethernet over GRE Tunnels, Ethernet over Multiprotocol Label Switching (MPLS), Ethernet over USB, Controller Area Network (CAN), Local Interconnect Network (LIN), DeviceNet, ControlNet, Data Highway+, PROFIBUS, or PROFINET, among many others), cellular communication components, NFC components, Bluetooth® (or Bluetooth® Low Energy) components, WiFi® components, and other communication components. Network connectivity may be provided to/from the computing device 700 via the communication resources 730 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The communication resources 730 may include one or more dedicated processors and/or FPGAs to communicate using one or more of the aforementioned network interface protocols.

Instructions 750 may comprise software, a program, an application, an applet, an app, or other executable code for causing at least any of the processors 710 to perform any one or more of the methodologies discussed herein. The instructions 750 may reside, completely or partially, within at least one of the processors 710 (e.g., within the processor's cache memory), the memory/storage devices 720, or any suitable combination thereof. Furthermore, any portion of the instructions 750 may be transferred to the hardware resources 700 from any combination of the peripheral devices 704 or the databases 706. Accordingly, the memory of processors 710, the memory/storage devices 720, the peripheral devices 704, and the databases 706 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Additional examples of the presently described embodiments include the following, non-limiting implementations. Each of the following non-limiting examples may stand on its own or may be combined in any permutation or combination with any one or more of the other examples provided below or throughout the present disclosure.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below.

The following examples pertain to further embodiments.

Example 1 may include an apparatus for a service producer in a 5G system (5GS) comprising a processor; and a memory, the processor configured to: decode a service request received from a management service consumer for the 5G system (5GS), wherein the service request may be associated with a performance measurement collection service to be delivered by the service producer to the service consumer related to a network exposure function (NEF); detect performance measurements data received from the NEF; decode from the performance measurements data a measurement label associated with the performance measurements data based on the service request; and encode a service response based on the performance measurements data received from the NEF.

Example 2 may include the device of example 1 and/or some other example herein, wherein decoding the service request triggers the NEF to initiate a generation and delivery of the performance measurements data.

Example 3 may include the device of example 1 and/or some other example herein, wherein the performance measurement may be based on a number of application function (AF) session with quality of service (QoS) creation requests, a number of successful AF session with QoS creation, a number of failed AF session with QoS creation, or a number of AF session with QoS notifications.

Example 4 may include the device of example 1 and/or some other example herein, wherein the performance measurement may be based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

Example 5 may include the device of example 1 and/or some other example herein, wherein the performance measurement may be based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions.

Example 6 may include the device of example 1 and/or some other example herein, wherein the service producer may be outside the NEF in a separate management system or inside the NEF.

Example 7 may include the device of example 1 and/or some other example herein, wherein to generate a first performance measurement comprises the processor being further configured to initiate a cumulative counter for measurements during a collection period.

Example 8 may include the device of example 3 and/or some other example herein, wherein the number of AF session with QoS creation requests may be cumulated on receipt of an Nnef_AFsessionWithQoS_Create request by the NEF from an AF, the number of successful AF session with QoS creations may be cumulated on transmission of an Nnef_AFsessionWithQoS_Create response by the NEF to an AF indicating a successful AF session with QoS creation, the number of failed AF session with QoS creations may be cumulated on transmission of an Nnef_AFsessionWithQoS_Create response by the NEF to an AF indicating a failed AF session with QoS creation and each message increments a relevant subcounter per failure cause by 1, and the number of AF session with QoS notifications may be cumulated on transmission of an Nnef_AFsessionWithQoS_Notify message by the NEF to an AF.

Example 9 may include the device of example 4 and/or some other example herein, wherein the number of background data transfer policy application requests may be cumulated on receipt by the NEF of an Nnef_ApplyPolicy_Create request message from AF, the number of successful background data transfer policy applications may be cumulated on transmission by the NEF of an Nnef_ApplyPolicy_Create response message to SMF indicating a successful background data transfer policy application, the number of failed background data transfer policy applications may be cumulated on transmission by the NEF of an Nnef_ApplyPolicy_Create response message to AF indicating a failed background data transfer policy application and each message increments a relevant subcounter per failure cause by 1, the number of background data transfer policy update requests may be cumulated on receipt by the NEF of an Nnef_ApplyPolicy_Update request message from AF, the number of successful background data transfer policy updates may be cumulated on transmission by the NEF of an Nnef_ApplyPolicy_Update response message to AF indicating a successful background data transfer policy update, the number of failed background data transfer policy updates may be cumulated on transmission by the NEF of an Nnef_ApplyPolicy_Update response message to AF indicating a failed background data transfer policy update and each message increments a relevant subcounter per failure cause by 1, the number of background data transfer policy deletion requests may be cumulated on receipt by the NEF of an Nnef_ApplyPolicy_Delete request message from AF, the number of successful background data transfer policy deletions may be cumulated on transmission by the NEF of an Nnef_ApplyPolicy_Delete response message to AF indicating a successful background data transfer policy deletion, and the number of failed background data transfer policy deletions may be cumulated on transmission by the NEF of an Nnef_ApplyPolicy_Delete response message to AF indicating a failed background data transfer policy deletion and each message increments a relevant subcounter per failure cause by 1.

Example 10 may include the device of example 5 and/or some other example herein, wherein the number of UCMF dictionary entry creation requests may be cumulated on receipt of an Nnef_UCMFProvisioning_Create request by the NEF from an AF, the number of successful UCMF dictionary entry creations may be cumulated on transmission of an Nnef_UCMFProvisioning_Create response by the NEF to an AF indicating a successful UCMF dictionary entry creation, the number of failed UCMF dictionary entry creations may be cumulated on transmission of an Nnef_UCMFProvisioning_Create response by the NEF to an AF indicating a failed UCMF dictionary entry creation and each message increments a relevant subcounter per failure cause by 1, the number of UCMF dictionary entry deletion requests may be cumulated on receipt of an Nnef_UCMF- Provisioning_Delete request by the NEF from an AF, the number of successful UCMF dictionary entry deletions may be cumulated on transmission of an Nnef_UCMFProvisioning_Delete response by the NEF to an AF indicating a successful UCMF dictionary entry deletion, and the number of failed UCMF dictionary entry deletions may be cumulated on transmission of an Nnef_UCMFProvisioning_Delete response by the NEF to an AF indicating a failed UCMF dictionary entry deletion and each message increments a relevant subcounter per failure cause by 1.

Example 11 may include the device of example 7 and/or some other example herein, wherein an initial value of the cumulative counter may be set to zero at a beginning of every collection period.

Example 12 may include a computer-readable medium storing computer-executable instructions which when executed by one or more processors for a service producer in a 5G system (5GS) result in performing operations comprising: decoding a service request received from a management service consumer for the 5G system (5GS), wherein the service request may be associated with a performance measurement collection service to be delivered by the service producer to the service consumer related to a network exposure function (NEF); detecting performance measurements data received from the NEF; decoding from the performance measurements data a measurement label associated with the performance measurements data based on the service request; and encoding a service response based on the performance measurements data received from the NEF.

Example 13 may include the computer-readable medium storing of example 12 and/or some other example herein, wherein decoding the service request triggers the NEF to initiate a generation and delivery of the performance measurements data.

Example 14 may include the computer-readable medium storing of example 12 and/or some other example herein, wherein the performance measurement may be based on a number of application function (AF) session with quality of service (QoS) creation requests, a number of successful AF session with QoS creation, a number of failed AF session with QoS creation, or a number of AF session with QoS notifications.

Example 15 may include the computer-readable medium storing of example 12 and/or some other example herein, wherein the performance measurement may be based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

Example 16 may include the computer-readable medium storing of example 12 and/or some other example herein, wherein the performance measurement may be based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions.

Example 17 may include the computer-readable medium storing of example 12 and/or some other example herein, wherein the service producer may be outside the NEF in a separate management system or inside the NEF.

Example 18 may include the computer-readable medium storing of example 12 and/or some other example herein, wherein to generate a first performance measurement comprises the processor being further configured to initiate a cumulative counter for measurements during a collection period.

Example 19 may include the computer-readable medium storing of example 14 and/or some other example herein, wherein the number of AF session with QoS creation requests may be cumulated on receipt of an Nnef_AFsessionWithQoS_Create request by the NEF from an AF, the number of successful AF session with QoS creations may be cumulated on transmission of an Nnef_AFsessionWithQoS_Create response by the NEF to an AF indicating a successful AF session with QoS creation, the number of failed AF session with QoS creations may be cumulated on transmission of an Nnef_AFsessionWithQoS_Create response by the NEF to an AF indicating a failed AF session with QoS creation and each message increments a relevant subcounter per failure cause by 1, and the number of AF session with QoS notifications may be cumulated on transmission of an Nnef_AFsessionWithQoS_Notify message by the NEF to an AF.

Example 20 may include the computer-readable medium storing of example 15 and/or some other example herein, wherein the number of background data transfer policy application requests may be cumulated on receipt by the NEF of an Nnef_ApplyPolicy_Create request message from AF, the number of successful background data transfer policy applications may be cumulated on transmission by the NEF of an Nnef_ApplyPolicy_Create response message to SMF indicating a successful background data transfer policy application, the number of failed background data transfer policy applications may be cumulated on transmission by the NEF of an Nnef_ApplyPolicy_Create response message to AF indicating a failed background data transfer policy application and each message increments a relevant subcounter per failure cause by 1, the number of background data transfer policy update requests may be cumulated on receipt by the NEF of an Nnef_ApplyPolicy_Update request message from AF, the number of successful background data transfer policy updates may be cumulated on transmission by the NEF of an Nnef_ApplyPolicy_Update response message to AF indicating a successful background data transfer policy update, the number of failed background data transfer policy updates may be cumulated on transmission by the NEF of an Nnef_ApplyPolicy_Update response message to AF indicating a failed background data transfer policy update and each message increments a relevant subcounter per failure cause by 1, the number of background data transfer policy deletion requests may be cumulated on receipt by the NEF of an Nnef_ApplyPolicy_Delete request message from AF, the number of successful background data transfer policy deletions may be cumulated on transmission by the NEF of an Nnef_ApplyPolicy_Delete response message to AF indicating a successful background data transfer policy deletion, and the number of failed background data transfer policy deletions may be cumulated on transmission by the NEF of an Nnef_ApplyPolicy_Delete response message to AF indicating a failed background data transfer policy deletion and each message increments a relevant subcounter per failure cause by 1.

Example 21 may include the computer-readable medium storing of example 16 and/or some other example herein, wherein the number of UCMF dictionary entry creation requests may be cumulated on receipt of an Nnef_UCMF-Provisioning_Create request by the NEF from an AF, the number of successful UCMF dictionary entry creations may be cumulated on transmission of an Nnef_UCMFProvisioning_Create response by the NEF to an AF indicating a successful UCMF dictionary entry creation, the number of failed UCMF dictionary entry creations may be cumulated on transmission of an Nnef_UCMFProvisioning_Create response by the NEF to an AF indicating a failed UCMF dictionary entry creation and each message increments a relevant subcounter per failure cause by 1, the number of UCMF dictionary entry deletion requests may be cumulated on receipt of an Nnef_UCMFProvisioning_Delete request by the NEF from an AF, the number of successful UCMF dictionary entry deletions may be cumulated on transmission of an Nnef_UCMFProvisioning_Delete response by the NEF to an AF indicating a successful UCMF dictionary entry deletion, and the number of failed UCMF dictionary entry deletions may be cumulated on transmission of an Nnef_UCMFProvisioning_Delete response by the NEF to an AF indicating a failed UCMF dictionary entry deletion and each message increments a relevant subcounter per failure cause by 1.

Example 22 may include the computer-readable medium storing of example 18 and/or some other example herein, wherein an initial value of the cumulative counter may be set to zero at a beginning of every collection period.

Example 23 may include a method comprising: decoding a service request received from a management service consumer for the 5G system (5GS), wherein the service request may be associated with a performance measurement collection service to be delivered by the service producer to the service consumer related to a network exposure function (NEF); detecting performance measurements data received from the NEF; decoding from the performance measurements data a measurement label associated with the performance measurements data based on the service request; and encoding a service response based on the performance measurements data received from the NEF.

Example 24 may include the method of example 23 and/or some other example herein, wherein decoding the service request triggers the NEF to initiate a generation and delivery of the performance measurements data.

Example 25 may include the method of example 23 and/or some other example herein, wherein the performance measurement may be based on a number of application function (AF) session with quality of service (QoS) creation requests, a number of successful AF session with QoS creation, a number of failed AF session with QoS creation, or a number of AF session with QoS notifications.

Example 26 may include the method of example 23 and/or some other example herein, wherein the performance measurement may be based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

Example 27 may include the method of example 23 and/or some other example herein, wherein the performance measurement may be based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions.

Example 28 may include the method of example 23 and/or some other example herein, wherein the service producer may be outside the NEF in a separate management system or inside the NEF.

Example 29 may include the method of example 23 and/or some other example herein, wherein to generate a first performance measurement comprises the processor being further configured to initiate a cumulative counter for measurements during a collection period.

Example 30 may include the method of example 25 and/or some other example herein, wherein the number of AF session with QoS creation requests may be cumulated on receipt of an Nnef_AFsessionWithQoS_Create request by the NEF from an AF, the number of successful AF session with QoS creations may be cumulated on transmission of an Nnef_AFsessionWithQoS_Create response by the NEF to an AF indicating a successful AF session with QoS creation, the number of failed AF session with QoS creations may be cumulated on transmission of an Nnef_AFsessionWithQoS_Create response by the NEF to an AF indicating a failed AF session with QoS creation and each message increments a relevant subcounter per failure cause by 1, and the number of AF session with QoS notifications may be cumulated on transmission of an Nnef_AFsessionWithQoS_Notify message by the NEF to an AF.

Example 31 may include the method of example 26 and/or some other example herein, wherein the number of background data transfer policy application requests may be cumulated on receipt by the NEF of an Nnef_ApplyPolicy_Create request message from AF, the number of successful background data transfer policy applications may be cumulated on transmission by the NEF of an Nnef_ApplyPolicy_Create response message to SMF indicating a successful background data transfer policy application, the number of failed background data transfer policy applications may be cumulated on transmission by the NEF of an Nnef_ApplyPolicy_Create response message to AF indicating a failed background data transfer policy application and each message increments a relevant subcounter per failure cause by 1, the number of background data transfer policy update requests may be cumulated on receipt by the NEF of an Nnef_ApplyPolicy_Update request message from AF, the number of successful background data transfer policy updates may be cumulated on transmission by the NEF of an Nnef_ApplyPolicy_Update response message to AF indicating a successful background data transfer policy update, the number of failed background data transfer policy updates may be cumulated on transmission by the NEF of an Nnef_ApplyPolicy_Update response message to AF indicating a failed background data transfer policy update and each message increments a relevant subcounter per failure cause by 1, the number of background data transfer policy deletion requests may be cumulated on receipt by the NEF of an Nnef_ApplyPolicy_Delete request message from AF, the number of successful background data transfer policy deletions may be cumulated on transmission by the NEF of an Nnef_ApplyPolicy_Delete response message to AF indicating a successful background data transfer policy deletion, and the number of failed background data transfer policy deletions may be cumulated on transmission by the NEF of an Nnef_ApplyPolicy_Delete response message to AF indicating a failed background data transfer policy deletion and each message increments a relevant subcounter per failure cause by 1.

Example 32 may include the method of example 27 and/or some other example herein, wherein the number of UCMF dictionary entry creation requests may be cumulated on receipt of an Nnef_UCMFProvisioning_Create request by the NEF from an AF, the number of successful UCMF dictionary entry creations may be cumulated on transmission of an Nnef_UCMFProvisioning_Create response by the NEF to an AF indicating a successful UCMF dictionary entry creation, the number of failed UCMF dictionary entry creations may be cumulated on transmission of an Nnef_UCMFProvisioning_Create response by the NEF to an AF indicating a failed UCMF dictionary entry creation and each message increments a relevant subcounter per failure cause by 1, the number of UCMF dictionary entry deletion requests may be cumulated on receipt of an Nnef_UCMFProvisioning_Delete request by the NEF from an AF, the number of successful UCMF dictionary entry deletions may be cumulated on transmission of an Nnef_UCMFProvisioning_Delete response by the NEF to an AF indicating a successful UCMF dictionary entry deletion, and the number of failed UCMF dictionary entry deletions may be cumulated on transmission of an Nnef_UCMFProvisioning_Delete response by the NEF to an AF indicating a failed UCMF dictionary entry deletion and each message increments a relevant subcounter per failure cause by 1.

Example 33 may include the method of example 29 and/or some other example herein, wherein an initial value of the cumulative counter may be set to zero at a beginning of every collection period.

Example 34 may include an apparatus comprising means for: decoding a service request received from a management service consumer for the 5G system (5GS), wherein the service request may be associated with a performance measurement collection service to be delivered by the service producer to the service consumer related to a network exposure function (NEF); detecting performance measurements data received from the NEF; decoding from the performance measurements data a measurement label associated with the performance measurements data based on the service request; and encoding a service response based on the performance measurements data received from the NEF.

Example 35 may include the apparatus of example 34 and/or some other example herein, wherein decoding the service request triggers the NEF to initiate a generation and delivery of the performance measurements data.

Example 36 may include the apparatus of example 34 and/or some other example herein, wherein the performance measurement may be based on a number of application function (AF) session with quality of service (QoS) creation requests, a number of successful AF session with QoS creation, a number of failed AF session with QoS creation, or a number of AF session with QoS notifications.

Example 37 may include the apparatus of example 34 and/or some other example herein, wherein the performance measurement may be based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

Example 38 may include the apparatus of example 34 and/or some other example herein, wherein the performance measurement may be based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions.

Example 39 may include the apparatus of example 34 and/or some other example herein, wherein the service producer may be outside the NEF in a separate management system or inside the NEF.

Example 40 may include the apparatus of example 34 and/or some other example herein, wherein to generate a first performance measurement comprises the processor being further configured to initiate a cumulative counter for measurements during a collection period.

Example 41 may include the apparatus of example 36 and/or some other example herein, wherein the number of AF session with QoS creation requests may be cumulated on receipt of an Nnef_AFsessionWithQoS_Create request by the NEF from an AF, the number of successful AF session with QoS creations may be cumulated on transmission of an Nnef_AFsessionWithQoS_Create response by the NEF to an AF indicating a successful AF session with QoS creation, the number of failed AF session with QoS creations may be cumulated on transmission of an Nnef_AFsessionWithQoS_Create response by the NEF to an AF indicating a failed AF session with QoS creation and each message increments a relevant subcounter per failure cause by 1, and the number of AF session with QoS notifications may be cumulated on transmission of an Nnef_AFsessionWithQoS_Notify message by the NEF to an AF.

Example 42 may include the apparatus of example 37 and/or some other example herein, wherein the number of background data transfer policy application requests may be cumulated on receipt by the NEF of an Nnef_ApplyPolicy_Create request message from AF, the number of successful background data transfer policy applications may be cumulated on transmission by the NEF of an Nnef_ApplyPolicy_Create response message to SMF indicating a successful background data transfer policy application, the number of failed background data transfer policy applications may be cumulated on transmission by the NEF of an Nnef_ApplyPolicy_Create response message to AF indicating a failed background data transfer policy application and each message increments a relevant subcounter per failure cause by 1, the number of background data transfer policy update requests may be cumulated on receipt by the NEF of an Nnef_ApplyPolicy_Update request message from AF, the number of successful background data transfer policy updates may be cumulated on transmission by the NEF of an Nnef_ApplyPolicy_Update response message to AF indicating a successful background data transfer policy update, the number of failed background data transfer policy updates may be cumulated on transmission by the NEF of an Nnef_ApplyPolicy_Update response message to AF indicating a failed background data transfer policy update and each message increments a relevant subcounter per failure cause by 1, the number of background data transfer policy deletion requests may be cumulated on receipt by the NEF of an Nnef_ApplyPolicy_Delete request message from AF, the number of successful background data transfer policy deletions may be cumulated on transmission by the NEF of an Nnef_ApplyPolicy_Delete response message to AF indicating a successful background data transfer policy deletion, and the number of failed background data transfer policy deletions may be cumulated on transmission by the NEF of an Nnef_ApplyPolicy_Delete response message to AF indicating a failed background data transfer policy deletion and each message increments a relevant subcounter per failure cause by 1.

Example 43 may include the apparatus of example 38 and/or some other example herein, wherein the number of UCMF dictionary entry creation requests may be cumulated on receipt of an Nnef_UCMFProvisioning_Create request by the NEF from an AF, the number of successful UCMF dictionary entry creations may be cumulated on transmission of an Nnef_UCMFProvisioning_Create response by the NEF to an AF indicating a successful UCMF dictionary entry creation, the number of failed UCMF dictionary entry creations may be cumulated on transmission of an Nnef_UCMFProvisioning_Create response by the NEF to an AF indicating a failed UCMF dictionary entry creation and each message increments a relevant subcounter per failure cause by 1, the number of UCMF dictionary entry deletion requests may be cumulated on receipt of an Nnef_UCMF-Provisioning_Delete request by the NEF from an AF, the number of successful UCMF dictionary entry deletions may be cumulated on transmission of an Nnef_UCMFProvisioning_Delete response by the NEF to an AF indicating a successful UCMF dictionary entry deletion, and the number of failed UCMF dictionary entry deletions may be cumulated on transmission of an Nnef_UCMFProvisioning_Delete response by the NEF to an AF indicating a failed UCMF dictionary entry deletion and each message increments a relevant subcounter per failure cause by 1.

Example 44 may include the apparatus of example 40 and/or some other example herein, wherein an initial value of the cumulative counter may be set to zero at a beginning of every collection period.

Example 45 may include an apparatus comprising means for performing any of the methods of examples 1-44.

Example 46 may include a network node comprising a communication interface and processing circuitry connected thereto and configured to perform the methods of examples 1-44.

Example 47 may include an apparatus comprising means to perform one or more elements of a method described in or related to any of examples 1-44, or any other method or process described herein.

Example 48 may include one or more non-transitory computer-readable media comprising instructions to cause an electronic device, upon execution of the instructions by one or more processors of the electronic device, to perform one or more elements of a method described in or related to any of examples 1-44, or any other method or process described herein.

Example 49 may include an apparatus comprising logic, modules, or circuitry to perform one or more elements of a method described in or related to any of examples 1-44, or any other method or process described herein.

Example 50 may include a method, technique, or process as described in or related to any of examples 1-44, or portions or parts thereof.

Example 51 may include an apparatus comprising: one or more processors and one or more computer-readable media comprising instructions that, when executed by the one or more processors, cause the one or more processors to perform the method, techniques, or process as described in or related to any of examples 1-44, or portions thereof.

Example 52 may include a signal as described in or related to any of examples 1-44, or portions or parts thereof.

Example 53 may include a datagram, packet, frame, segment, protocol data unit (PDU), or message as described in or related to any of examples 1-44, or portions or parts thereof, or otherwise described in the present disclosure.

Example 54 may include a signal encoded with data as described in or related to any of examples 1-44, or portions or parts thereof, or otherwise described in the present disclosure.

Example 55 may include a signal encoded with a datagram, packet, frame, segment, protocol data unit (PDU), or message as described in or related to any of examples 1-44, or portions or parts thereof, or otherwise described in the present disclosure.

Example 56 may include an electromagnetic signal carrying computer-readable instructions, wherein execution of the computer-readable instructions by one or more processors is to cause the one or more processors to perform the method, techniques, or process as described in or related to any of examples 1-44, or portions thereof.

Example 57 may include a computer program comprising instructions, wherein execution of the program by a processing element is to cause the processing element to carry out the method, techniques, or process as described in or related to any of examples 1-44, or portions thereof.

Example 58 may include a signal in a wireless network as shown and described herein.

Example 59 may include a method of communicating in a wireless network as shown and described herein.

Example 60 may include a system for providing wireless communication as shown and described herein.

Example 61 may include a device for providing wireless communication as shown and described herein.

An example implementation is an edge computing system, including respective edge processing devices and nodes to invoke or perform the operations of the examples above, or other subject matter described herein. Another example implementation is a client endpoint node, operable to invoke or perform the operations of the examples above, or other subject matter described herein. Another example implementation is an aggregation node, network hub node, gateway node, or core data processing node, within or coupled to an edge computing system, operable to invoke or perform the operations of the examples above, or other subject matter described herein. Another example implementation is an access point, base station, road-side unit, street-side unit, or on-premise unit, within or coupled to an edge computing system, operable to invoke or perform the operations of the examples above, or other subject matter described herein. Another example implementation is an edge provisioning node, service orchestration node, application orchestration node, or multi-tenant management node, within or coupled to an edge computing system, operable to invoke or perform the operations of the examples above, or other subject matter described herein. Another example implementation is an edge node operating an edge provisioning service, application or service orchestration service, virtual machine deployment, container deployment, function deployment, and compute management, within or coupled to an edge computing system, operable to invoke or perform the operations of the examples above, or other subject matter described herein. Another example implementation is an edge computing system operable as an edge mesh, as an edge mesh with side car loading, or with mesh-to-mesh communications, operable to invoke or perform the operations of the examples above, or other subject matter described herein. Another example implementation is an edge computing system including aspects of network functions, acceleration functions, acceleration hardware, storage hardware, or computation hardware resources, operable to invoke or perform the use cases discussed herein, with use of the examples above, or other subject matter described herein. Another example implementation is an edge computing system adapted for supporting client mobility, vehicle-to-vehicle (V2V), vehicle-to-everything (V2X), or vehicle-to-infrastructure (V2I) scenarios, and optionally operating according to ETSI MEC specifications, operable to invoke or perform the use cases discussed herein, with use of the examples above, or other subject matter described herein. Another example implementation is an edge computing system adapted for mobile wireless communications, including configurations according to an 3GPP 4G/LTE or 5G network capabilities, operable to invoke or perform the use cases discussed herein, with use of the examples above, or other subject matter described herein. Another example implementation is a computing system adapted for network communications, including configurations according to an O-RAN capabilities, operable to invoke or perform the use cases discussed herein, with use of the examples above, or other subject matter described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (2019 June). For the purposes of the present document, the following abbreviations may apply to the examples and embodiments discussed herein.

TABLE 1

| Abbreviations: | |
|---|---|
| 3GPP | Third Generation Partnership Project |
| 4G | Fourth Generation |
| 5G | Fifth Generation |
| 5GC | 5G Core network |
| AC | Application Client |
| ACK | Acknowledgement |
| ACID | Application Client Identification |
| AF | Application Function |
| AM | Acknowledged Mode |
| AMBR | Aggregate Maximum Bit Rate |
| AMF | Access and Mobility Management Function |
| AN | Access Network |
| ANR | Automatic Neighbour Relation |
| AOA | Angle of Arrival |
| AP | Application Protocol, Antenna Port, Access Point |
| API | Application Programming Interface |
| APN | Access Point Name |
| ARP | Allocation and Retention Priority |
| ARQ | Automatic Repeat Request |

TABLE 1-continued

| Abbreviations: | |
|---|---|
| AS | Access Stratum |
| ASP | Application Service Provider |
| ASN.1 | Abstract Syntax Notation One |
| AUSF | Authentication Server Function |
| AWGN | Additive White Gaussian Noise |
| BAP | Backhaul Adaptation Protocol |
| BCH | Broadcast Channel |
| BER | Bit Error Ratio |
| BFD | Beam Failure Detection |
| BLER | Block Error Rate |
| BPSK | Binary Phase Shift Keying |
| BRAS | Broadband Remote Access Server |
| BSS | Business Support System |
| BS | Base Station |
| BSR | Buffer Status Report |
| BW | Bandwidth |
| BWP | Bandwidth Part |
| C-RNTI | Cell Radio Network Temporary Identity |
| CA | Carrier Aggregation, Certification Authority |
| CAPEX | CAPital EXpenditure |
| CBRA | Contention Based Random Access |
| CC | Component Carrier, Country Code, Cryptographic Checksum |
| CCA | Clear Channel Assessment |
| CCE | Control Channel Element |
| CCCH | Common Control Channel |
| CE | Coverage Enhancement |
| CDM | Content Delivery Network |
| CDMA | Code-Division Multiple Access |
| CFRA | Contention Free Random Access |
| CG | Cell Group |
| CGF | Charging Gateway Function |
| CHF | Charging Function |
| CI | Cell Identity |
| CID | Cell-ID (e g., positioning method) |
| CIM | Common Information Model |
| CIR | Carrier to Interference Ratio |
| CK | Cipher Key |
| CM | Connection Management, Conditional Mandatory |
| CMAS | Commercial Mobile Alert Service |
| CMD | Command |
| CMS | Cloud Management System |
| CO | Conditional Optional |
| CoMP | Coordinated Multi-Point |
| CORESET | Control Resource Set |
| COTS | Commercial Off-The-Shelf |
| CP | Control Plane, Cyclic Prefix, Connection Point |
| CPD | Connection Point Descriptor |
| CPE | Customer Premise Equipment |
| CPICH | Common Pilot Channel |
| CQI | Channel Quality Indicator |
| CPU | CSI processing unit, Central Processing Unit |
| C/R | Command/Response field bit |
| CRAN | Cloud Radio Access Network, Cloud RAN |
| CRB | Common Resource Block |
| CRC | Cyclic Redundancy Check |
| CRI | Channel-State Information Resource Indicator, CSI-RS Resource Indicator |
| C-RNTI | Cell RNTI |
| CS | Circuit Switched |
| CSAR | Cloud Service Archive |
| CSI | Channel-State Information |
| CSI-IM | CSI Interference Measurement |
| CSI-RS | CSI Reference Signal |
| CSI-RSRP | CSI reference signal received power |
| CSI-RSRQ | CSI reference signal received quality |
| CSI-SINR | CSI signal-to-noise and interference ratio |
| CSMA | Carrier Sense Multiple Access |
| CSMA/CA | CSMA with collision avoidance |
| CSS | Common Search Space, Cell-specific Search Space |
| CTF | Charging Trigger Function |
| CTS | Clear-to-Send |
| CW | Codeword |
| CWS | Contention Window Size |
| D2D | Device-to-Device |
| DC | Dual Connectivity, Direct Current |
| DCI | Downlink Control Information |
| DF | Deployment Flavour |

TABLE 1-continued

| Abbreviations: | |
|---|---|
| DL | Downlink |
| DMTF | Distributed Management Task Force |
| DPDK | Data Plane Development Kit |
| DM-RS, DMRS | Demodulation Reference Signal |
| DN | Data network |
| DNN | Data Network Name |
| DNAI | Data Network Access Identifier |
| DRB | Data Radio Bearer |
| DRS | Discovery Reference Signal |
| DRX | Discontinuous Reception |
| DSL | Domain Specific Language. Digital Subscriber Line |
| DSLAM | DSL Access Multiplexer |
| DwPTS | Downlink Pilot Time Slot |
| E-LAN | Ethernet Local Area Network |
| E2E | End-to-End |
| ECCA | extended clear channel assessment, extended CCA |
| ECCE | Enhanced Control Channel Element, Enhanced CCE |
| ED | Energy Detection |
| EDGE | Enhanced Datarates for GSM Evolution (GSM Evolution) |
| EAS | Edge Application Server |
| EASID | Edge Application Server Identification |
| ECS | Edge Configuration Server |
| ECSP | Edge Computing Service Provider |
| EDN | Edge Data Network |
| EEC | Edge Enabler Client |
| EECID | Edge Enabler Client Identification |
| EES | Edge Enabler Server |
| EESID | Edge Enabler Server Identification |
| EHE | Edge Hosting Environment |
| EGMF | Exposure Governance tableManagement Function |
| EGPRS | Enhanced GPRS |
| EIR | Equipment Identity Register |
| eLAA | enhanced Licensed Assisted Access, enhanced LAA |
| EM | Element Manager |
| eMBB | Enhanced Mobile Broadband |
| EMS | Element Management System |
| eNB | evolved NodeB, E-UTRAN Node B |
| EN-DC | E-UTRA-NR Dual Connectivity |
| EPC | Evolved Packet Core |
| EPDCCH | enhanced PDCCH, enhanced Physical Downlink Control Cannel |
| EPRE | Energy per resource element |
| EPS | Evolved Packet System |
| EREG | enhanced REG, enhanced resource element groups |
| ETSI | European Telecommunications Standards Institute |
| ETWS | Earthquake and Tsunami Warning System |
| eUICC | embedded UICC, embedded Universal Integrated Circuit Card |
| E-UTRA | Evolved UTRA |
| E-UTRAN | Evolved UTRAN |
| EV2X | Enhanced V2X |
| F1AP | F1 Application Protocol |
| F1-C | F1 Control plane interface |
| F1-U | F1 User plane interface |
| FACCH | Fast Associated Control CHannel |
| FACCH/F | Fast Associated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhanced Licensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |

TABLE 1-continued

| Abbreviations: | |
|---|---|
| GERAN | GSM EDGE RAN, GSM EDGE Radio Access Network |
| GGSN | Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-U | GPRS Tunnelling Protocol for User Plane |
| GTS | Go To Sleep Signal (related to WUS) |
| GUMMEI | Globally Unique MME Identifier |
| GUTI | Globally Unique Temporary UE Identity |
| HARQ | Hybrid ARQ, Hybrid Automatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text Transfer Protocol Secure (https is http/1.1 over SSL, i.e. port 443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IM | Interference Measurement, Intermodulation, IP Multimedia |
| IMC | IMS Credentials |
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN |
| | Constraint length of the convolutional code, USIM Individual key |
| kB | Kilobyte (1000 bytes) |
| kbps | kilo-bits per second |

TABLE 1-continued

| Abbreviations: | |
|---|---|
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG T WG3 context) |
| MAC-I | MAC used for data integrity of signalling messages (TSG T WG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment |
| MeNB | master eNB |
| MER | Message Error Ratio |
| MGL | Measurement Gap Length |
| MGRP | Measurement Gap Repetition Period |
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications |

TABLE 1-continued

| Abbreviations: | |
|---|---|
| mMTC | massive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non-Access Stratum layer |
| NCT | Network Connectivity Topology |
| NC-JT | Non-Coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband Physical Uplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit - type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |
| PAR | Peak to Average Ratio |
| PBCH | Physical Broadcast Channel |
| PC | Power Control, Personal Computer |
| PCC | Primary Component Carrier, Primary CC |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |

TABLE 1-continued

| Abbreviations: | |
|---|---|
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |

TABLE 1-continued

| Abbreviations: | |
|---|---|
| Rx | Reception, Receiving, Receiver |
| S1AP | S1 Application Protocol |
| S1-MME | S1 for the control plane |
| S1-U | S1 for the user plane |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |
| SpCell | Special Cell |
| SP-CSI-RNTI | Semi-Persistent CSI RNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization Signal |
| SSB | Synchronization Signal Block |
| SSID | Service Set Identifier |
| SS/PBCH | Block |
| SSBRI | SS/PBCH Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |

TABLE 1-continued

| Abbreviations: | |
|---|---|
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastruction |
| V2P | Vehicle-to-Pedestrian |
| V2V | Vehicle-to-Vehicle |
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | eXtensible Markup Language |
| XRES | EXpected user RESponse |
| XOR | eXclusive OR |
| ZC | Zadoff-Chu |
| ZP | Zero Po |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

Terminology

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "memory" and/or "memory circuitry" as used herein refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource. The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "cloud computing" or "cloud" refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like). The term "computing resource" or simply "resource" refers to any physical or virtual component, or usage of such components, of limited availability within a computer system or network. Examples of computing resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable. As used herein, the term "cloud service provider" (or CSP) indicates an organization which operates typically large-scale "cloud" resources comprised of centralized, regional, and edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to edge computing.

As used herein, the term "data center" refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

As used herein, the term "edge computing" refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership). As used herein, the term "edge compute node" refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" or "edge computing network" generally refer to a distributed architecture, organization, or collection of multiple nodes and devices, and which is organized to accomplish or offer some aspect of services or resources in an edge computing setting.

Additionally or alternatively, the term "Edge Computing" refers to a concept, as described in [6], that enables operator and 3rd party services to be hosted close to the UE's access point of attachment, to achieve an efficient service delivery through the reduced end-to-end latency and load on the transport network. As used herein, the term "Edge Computing Service Provider" refers to a mobile network operator or a 3rd party service provider offering Edge Computing service. As used herein, the term "Edge Data Network" refers to a local Data Network (DN) that supports the architecture for enabling edge applications. As used herein, the term "Edge Hosting Environment" refers to an environment providing support required for Edge Application Server's execution. As used herein, the term "Application Server" refers to application software resident in the cloud performing the server function.

The term "Internet of Things" or "IoT" refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smarthome, smart building and/or smart city technologies), and the like. IoT devices are usually low-power devices without heavy compute or storage capabilities. "Edge IoT devices" may be any kind of IoT devices deployed at a network's edge.

As used herein, the term "cluster" refers to a set or grouping of entities as part of an edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "application" may refer to a complete and deployable package, environment to achieve a certain function in an operational environment. The term "AI/ML application" or the like may be an application that contains some AI/ML models and application-level descriptions. The term "machine learning" or "ML" refers to the use of computer systems implementing algorithms and/or statistical models to perform specific task(s) without using explicit instructions, but instead relying on patterns and inferences. ML algorithms build or estimate mathematical model(s) (referred to as "ML models" or the like) based on sample data (referred to as "training data," "model training information," or the like) in order to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML assisted solution using the output of the ML model inference). The term "ML training host" refers to an entity, such as a network function, that hosts the training of the model. The term "ML inference host" refers to an entity, such as a network function, that hosts model during inference mode (which includes both the model execution as well as any online learning if applicable). The ML-host informs the actor about the output of the ML algorithm, and the actor takes a decision for an action (an "action" is performed by an actor as a result of the output of an ML assisted solution). The term "model inference information" refers to information used as an input to the ML model for determining inference(s); the data used to train an ML model and the data used to determine inferences may overlap, however, "training data" and "inference data" refer to different concepts.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, Apex®, CSS, JSP, MessagePack™ Apache® Thrift™, ASN.1, Google® Protocol Buffers (protobuf), or some other document(s)/format(s) such as those discussed herein. An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term "data element" or "element" as used herein refers to a unit that is indivisible at a given level of abstraction and has a clearly defined boundary. A data element is a logical component of an information object (e.g., electronic document) that may begin with a start tag (e.g., "<element>") and end with a matching end tag (e.g., "</element>"), or only has an empty element tag (e.g., "<element/>"). Any characters between the start tag and end tag, if any, are the element's content (referred to herein as "content items" or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., "<element>content item</element>"), attributes (e.g., "<element attribute="attributeValue">"), and other elements referred to as "child elements" (e.g., "<element1><element2>content item</element2></element1>"). An "attribute" may refer to a markup construct including a name-value pair that exists within a start tag or empty element tag. Attributes contain data related to its element and/or control the element's behavior.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

As used herein, the term "radio technology" refers to technology for wireless transmission and/or reception of electromagnetic radiation for information transfer. The term "radio access technology" or "RAT" refers to the technology used for the underlying physical connection to a radio based communication network. As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The term "access network" refers to any network, using any combination of radio technologies, RATs, and/or communication protocols, used to connect user devices and service providers. In the context of WLANs, an "access network" is an IEEE 802 local area network (LAN) or metropolitan area network (MAN) between terminals and access routers connecting to provider services. The term "access router" refers to router that terminates a medium access control (MAC) service from terminals and forwards user traffic to information servers according to Internet Protocol (IP) addresses.

The term "SMTC" refers to an SSB-based measurement timing configuration configured by SSB-MeasurementTimingConfiguration. The term "SSB" refers to a synchronization signal/Physical Broadcast Channel (SS/PBCH) block, which includes a Primary Syncrhonization Signal (PSS), a Secondary Syncrhonization Signal (SSS), and a PBCH. The term "a "Primary Cell" refers to the MCG cell, operating on the primary frequency, in which the UE either performs the initial connection establishment procedure or initiates the connection re-establishment procedure. The term "Primary SCG Cell" refers to the SCG cell in which the UE performs random access when performing the Reconfiguration with Sync procedure for DC operation. The term "Secondary Cell" refers to a cell providing additional radio resources on top of a Special Cell for a UE configured with CA. The term "Secondary Cell Group" refers to the subset of serving cells comprising the PSCell and zero or more secondary cells for a UE configured with DC. The term "Serving Cell" refers to the primary cell for a UE in RRC_CONNECTED not configured with CA/DC there is only one serving cell comprising of the primary cell. The term "serving cell" or "serving cells" refers to the set of cells comprising the Special Cell(s) and all secondary cells for a UE in RRC_CONNECTED configured with CA. The term "Special Cell" refers to the PCell of the MCG or the PSCell of the SCG for DC operation; otherwise, the term "Special Cell" refers to the Pcell.

The term "A1 policy" refers to a type of declarative policies expressed using formal statements that enable the non-RT RIC function in the SMO to guide the near-RT RIC function, and hence the RAN, towards better fulfilment of the RAN intent.

The term "A1 Enrichment information" refers to information utilized by near-RT RIC that is collected or derived at SMO/non-RT RIC either from non-network data sources or from network functions themselves.

The term "A1-Policy Based Traffic Steering Process Mode" refers to an operational mode in which the Near-RT RIC is configured through A1 Policy to use Traffic Steering Actions to ensure a more specific notion of network performance (for example, applying to smaller groups of E2 Nodes and UEs in the RAN) than that which it ensures in the Background Traffic Steering.

The term "Background Traffic Steering Processing Mode" refers to an operational mode in which the Near-RT RIC is configured through O1 to use Traffic Steering Actions to ensure a general background network performance which applies broadly across E2 Nodes and UEs in the RAN.

The term "Baseline RAN Behavior" refers to the default RAN behavior as configured at the E2 Nodes by SMO The term "E2" refers to an interface connecting the Near-RT RIC and one or more O-CU-CPs, one or more O-CU-UPs, one or more O-DUs, and one or more O-eNBs.

The term "E2 Node" refers to a logical node terminating E2 interface. In this version of the specification, ORAN nodes terminating E2 interface are: for NR access: O-CU-CP, O-CU-UP, O-DU or any combination; and for E-UTRA access: O-eNB.

The term "Intents", in the context of O-RAN systems/implementations, refers to declarative policy to steer or guide the behavior of RAN functions, allowing the RAN function to calculate the optimal result to achieve stated objective.

The term "O-RAN non-real-time RAN Intelligent Controller" or "non-RT RIC" refers to a logical function that enables non-real-time control and optimization of RAN elements and resources, AI/ML workflow including model training and updates, and policy-based guidance of applications/features in Near-RT RIC.

The term "Near-RT RIC" or "O-RAN near-real-time RAN Intelligent Controller" refers to a logical function that enables near-real-time control and optimization of RAN elements and resources via fine-grained (e.g., UE basis, Cell basis) data collection and actions over E2 interface.

The term "O-RAN Central Unit" or "O-CU" refers to a logical node hosting RRC, SDAP and PDCP protocols.

The term "O-RAN Central Unit—Control Plane" or "O-CU-CP" refers to a logical node hosting the RRC and the control plane part of the PDCP protocol.

The term "O-RAN Central Unit—User Plane" or "O-CU-UP" refers to a logical node hosting the user plane part of the PDCP protocol and the SDAP protocol The term "O-RAN Distributed Unit" or "O-DU" refers to a logical node hosting RLC/MAC/High-PHY layers based on a lower layer functional split.

The term "O-RAN eNB" or "O-eNB" refers to an eNB or ng-eNB that supports E2 interface.

The term "O-RAN Radio Unit" or "O-RU" refers to a logical node hosting Low-PHY layer and RF processing based on a lower layer functional split. This is similar to 3GPP's "TRP" or "RRH" but more specific in including the Low-PHY layer (FFT/iFFT, PRACH extraction).

The term "O1" refers to an interface between orchestration & management entities (Orchestration/NMS) and O-RAN managed elements, for operation and management, by which FCAPS management, Software management, File management and other similar functions shall be achieved.

The term "RAN UE Group" refers to an aggregations of UEs whose grouping is set in the E2 nodes through E2 procedures also based on the scope of A1 policies. These groups can then be the target of E2 CONTROL or POLICY messages.

The term "Traffic Steering Action" refers to the use of a mechanism to alter RAN behavior. Such actions include E2 procedures such as CONTROL and POLICY.

The term "Traffic Steering Inner Loop" refers to the part of the Traffic Steering processing, triggered by the arrival of periodic TS related KPM (Key Performance Measurement) from E2 Node, which includes UE grouping, setting additional data collection from the RAN, as well as selection and execution of one or more optimization actions to enforce Traffic Steering policies.

The term "Traffic Steering Outer Loop" refers to the part of the Traffic Steering processing, triggered by the near-RT RIC setting up or updating Traffic Steering aware resource optimization procedure based on information from A1 Policy setup or update, A1 Enrichment Information (EI) and/or outcome of Near-RT RIC evaluation, which includes the initial configuration (preconditions) and injection of related A1 policies, Triggering conditions for TS changes.

The term "Traffic Steering Processing Mode" refers to an operational mode in which either the RAN or the Near-RT RIC is configured to ensure a particular network performance. This performance includes such aspects as cell load and throughput, and can apply differently to different E2 nodes and UEs. Throughout this process, Traffic Steering Actions are used to fulfill the requirements of this configuration.

The term "Traffic Steering Target" refers to the intended performance result that is desired from the network, which is configured to Near-RT RIC over 01.

Furthermore, any of the disclosed embodiments and example implementations can be embodied in the form of various types of hardware, software, firmware, middleware, or combinations thereof, including in the form of control logic, and using such hardware or software in a modular or integrated manner. Additionally, any of the software components or functions described herein can be implemented as software, program code, script, instructions, etc., operable to be executed by processor circuitry. These components, functions, programs, etc., can be developed using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), EMCAScript, JavaScript, TypeScript, Jscript, ActionScript, Server-Side JavaScript (SSJS), PUP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, and/or any other programming language or development tools including proprietary programming languages and/or development tools. The software code can be stored as a computer- or processor-executable instructions or commands on a physical non-transitory computer-readable medium. Examples of suitable media include RAM, ROM, magnetic media such as a hard-drive or a floppy disk, or an optical medium such as a compact disk (CD) or DVD (digital versatile disk), flash memory, and the like, or any combination of such storage or transmission devices.

What is claimed is:

1. An apparatus for a service producer in a 5G system (5GS) comprising:

a processor configured to:

decode a service request received from a service consumer for the 5GS, wherein the service request is associated with a performance measurement collection service to be delivered by the service producer to the service consumer related to a network exposure function (NEF);

detect performance measurements data received from the NEF;

decode, from the performance measurements data, a measurement label associated with the performance measurements data based on the service request, wherein the performance measurement is based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions; and encode a service response based on the performance measurements data received from the NEF; and a memory to store the performance measurements data.

2. The apparatus of claim 1, wherein decoding the service request triggers the NEF to initiate a generation and delivery of the performance measurements data.

3. The apparatus of claim 1, wherein the performance measurement is based on a number of application function (AF) session with quality of service (QoS) creation requests, a number of successful AF session with QoS creation, a number of failed AF session with QoS creation, or a number of AF session with QoS notifications.

4. The apparatus of claim 1, wherein the performance measurement is based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

5. The apparatus of claim 1, wherein the service producer is outside the NEF in a separate management system or inside the NEF.

6. The apparatus of claim 1, wherein to generate a first performance measurement comprises the processor being further configured to initiate a cumulative counter for measurements during a collection period.

7. The apparatus of claim 3, wherein; the number of AF session with QoS creation requests is cumulated on receipt of an Nnef_AFsessionWithQoS_Create request by the NEF from an AF; the number of successful AF session with QoS creations is cumulated on transmission of an Nnef_AFsession WithQoS_Create response by the NEF to an AF indicating a successful AF session with QoS creation; the number of failed AF session with QoS creations is cumulated on transmission of an Nnef_AFsessionWithQoS_Create response by the NEF to an AF indicating a failed AF session with QoS creation and each message increments a relevant subcounter per failure cause by 1; and the number of AF session with QoS notifications is cumulated on transmission of an Nnef_AFsession WithQoS_Notify message by the NEF to an AF.

8. The apparatus of claim 4, wherein: the number of background data transfer policy application requests is cumulated on receipt by the NEF of an Nnef_ApplyPolicy_Create request message from AF; the number of successful background data transfer policy applications is cumulated on transmission by the NEF of an Nnef_ApplyPolicy_Create response message to SMF indicating a successful background data transfer policy application; the number of failed background data transfer policy applications is cumulated on transmission by the NEF of an Nnef_ApplyPolicy_Create response message to AF indicating a failed background data transfer policy application and each message increments a relevant subcounter per failure cause by 1; the number of background data transfer policy update requests is cumulated on receipt by the NEF of an Nnef_ApplyPolicy_Update request message from AF; the number of successful background data transfer policy updates is cumulated on transmission by the NEF of an Nnef_ApplyPolicy_Update response message to AF indicating a successful background data transfer policy update; the number of failed background data transfer policy updates is cumulated on transmission by the NEF of an Nnef_ApplyPolicy_Update response message to AF indicating a failed background data transfer policy update and each message increments a relevant subcounter per failure cause by 1; the number of background data transfer policy deletion requests is cumulated on receipt by the NEF of an Nnef_ApplyPolicy_Delete request message from AF; the number of successful background data transfer policy deletions is cumulated on transmission by the NEF of an Nnef_ApplyPolicy_Delete response message to AF indicating a successful background data transfer policy deletion; and the number of failed background data transfer policy deletions is cumulated on transmission by the NEF of an Nnef_ApplyPolicy_Delete response message to AF indicating a failed background data transfer policy deletion and each message increments a relevant subcounter per failure cause by 1.

9. The apparatus of claim 1, wherein: the number of UCMF dictionary entry creation requests is cumulated on receipt of an Nnef_UCMFProvisioning_Create request by the NEF from an AF; the number of successful UCMF dictionary entry creations is cumulated on transmission of an Nnef_UCMFProvisioning_Create response by the NEF to an AF indicating a successful UCMF dictionary entry creation; the number of failed UCMF dictionary entry creations is cumulated on transmission of an Nnef_UCMFProvisioning_Create response by the NEF to an AF indicating a failed UCMF dictionary entry creation and each message increments a relevant subcounter per failure cause by 1; the number of UCMF dictionary entry deletion requests is cumulated on receipt of an Nnef_UCMFProvisioning_Delete request by the NEF from an AF; the number of successful UCMF dictionary entry deletions is cumulated on transmission of an Nnef_UCMFProvisioning_Delete response by the NEF to an AF indicating a successful UCMF dictionary entry deletion; and the number of failed UCMF dictionary entry deletions is cumulated on transmission of an Nnef_UCMFProvisioning_Delete response by the NEF to an AF indicating a failed UCMF dictionary entry deletion and each message increments a relevant subcounter per failure cause by 1.

10. The apparatus of claim 6, wherein an initial value of the cumulative counter is set to zero at a beginning of every collection period.

11. A non-transitory computer-readable medium storing computer-executable instructions which when executed by one or more processors for a service producer in a 5G system (5GS) result in performing operations comprising:

decoding a service request received from a service consumer for the 5GS, wherein the service request is associated with a performance measurement collection service to be delivered by the service producer to the service consumer related to a network exposure function (NEF);

detecting performance measurements data received from the NEF;

decoding, from the performance measurements data, a measurement label associated with the performance measurements data based on the service request, wherein the performance measurement is based on a number of UE radio capability management function (UCMF) dictionary entry creation requests, a number of successful UCMF dictionary entry creations, a number of failed UCMF dictionary entry creations, a number of UCMF dictionary entry deletion requests, a number of successful UCMF dictionary entry deletions, or a number of failed UCMF dictionary entry deletions; and encoding a service response based on the performance measurements data received from the NEF.

12. The non-transitory computer-readable medium of claim 11, wherein decoding the service request triggers the NEF to initiate a generation and delivery of the performance measurements data.

13. The non-transitory computer-readable medium of claim 11, wherein the performance measurement is based on a number of application function (AF) session with quality of service (QoS) creation requests, a number of successful AF session with Qos creation, a number of failed AF session with QoS creation, or a number of AF session with QoS notifications.

14. The non-transitory computer-readable medium of claim 11, wherein the performance measurement is based on a number of background data transfer policy application requests, a number of successful background data transfer policy applications, a number of failed background data transfer policy applications, a number of background data transfer policy update requests, a number of successful background data transfer policy updates, a number of failed background data transfer policy updates, a number of background data transfer policy deletion requests, a number of successful background data transfer policy deletions, or a number of failed background data transfer policy deletions.

15. The non-transitory computer-readable medium of claim 11, wherein the service producer is outside the NEF in a separate management system or inside the NEF.

16. The non-transitory computer-readable medium of claim 11, wherein to generate a first performance measurement comprises the processor being further configured to initiate a cumulative counter for measurements during a collection period.

17. The non-transitory computer-readable medium of claim 13, wherein: the number of AF session with QoS creation requests is cumulated on receipt of an Nnef_AFsession WithQoS_Create request by the NEF from an AF; the number of successful AF session with QoS creations is cumulated on transmission of an Nnef_AFsession WithQoS_Create response by the NEF to an AF indicating a successful AF session with QoS creation; the number of failed AF session with QoS creations is cumulated on transmission of an Nnef_AFsession WithQoS_Create response by the NEF to an AF indicating a failed AF session with QoS creation and each message increments a relevant subcounter per failure cause by 1; and the number of AF session with QoS notifications is cumulated on transmission of an Nnef_AFsession WithQoS_Notify message by the NEF to an AF.

18. The non-transitory computer-readable medium of claim 14, wherein; the number of background data transfer policy application requests is cumulated on receipt by the NEF of an Nnef_ApplyPolicy_Create request message from AF; the number of successful background data transfer policy applications is cumulated on transmission by the NEF of an Nnef_ApplyPolicy_Create response message to SMF indicating a successful background data transfer policy application; the number of failed background data transfer policy applications is cumulated on transmission by the NEF of an Nnef_ApplyPolicy_Create response message to AF indicating a failed background data transfer policy application and each message increments a relevant subcounter per failure cause by 1; the number of background data transfer policy update requests is cumulated on receipt by the NEF of an Nnef_ApplyPolicy_Update request message from AF; the number of successful background data transfer policy updates is cumulated on transmission by the NEF of an Nnef_ApplyPolicy_Update response message to AF indicating a successful background data transfer policy update; the number of failed background data transfer policy updates is cumulated on transmission by the NEF of an Nnef_ApplyPolicy_Update response message to AF indicating a failed background data transfer policy update and each message increments a relevant subcounter per failure cause by 1; the number of background data transfer policy deletion requests is cumulated on receipt by the NEF of an Nnef_ApplyPolicy_Delete request message from AF; the number of successful background data transfer policy deletions is cumulated on transmission by the NEF of an Nnef_ApplyPolicy_Delete response message to AF indicating a successful background data transfer policy deletion; and the number of failed background data transfer policy deletions is cumulated on transmission by the NEF of an Nnef_ApplyPolicy_Delete response message to AF indicating a failed background data transfer policy deletion and each message increments a relevant subcounter per failure cause by 1.

* * * * *